United States Patent
Magadi et al.

(10) Patent No.: US 8,494,901 B2
(45) Date of Patent: Jul. 23, 2013

(54) METHODS AND SYSTEMS FOR MULTI-MERCHANT COUPONING

(75) Inventors: Diwakar Magadi, San Jose, CA (US); Prasad Sadhu, Fremont, CA (US); Srinivas Dundigalla, San Jose, CA (US); Vignesh Rathinasamy Somasundaram, Tamilnadu (IN)

(73) Assignee: eBay Inc., San Jose, CA (US)

( * ) Notice: Subject to any disclaimer, the term of this patent is extended or adjusted under 35 U.S.C. 154(b) by 505 days.

(21) Appl. No.: 12/875,949

(22) Filed: Sep. 3, 2010

(65) Prior Publication Data

US 2011/0202401 A1    Aug. 18, 2011

Related U.S. Application Data

(60) Provisional application No. 61/305,466, filed on Feb. 17, 2010.

(51) Int. Cl.
*G06Q 30/00*    (2012.01)

(52) U.S. Cl.
USPC .................... 705/14.1; 705/14.25; 705/14.27; 705/14.39; 705/14.54

(58) Field of Classification Search
USPC ............. 705/14.1, 14.25, 14.27, 14.39, 14.54
See application file for complete search history.

(56) References Cited

U.S. PATENT DOCUMENTS

| | | | |
|---|---|---|---|
| 8,185,437 B2 * | 5/2012 | Altberg et al. | 705/14.73 |
| 2009/0018942 A1 * | 1/2009 | Hamman et al. | 705/37 |
| 2011/0106606 A1 * | 5/2011 | Thordsen et al. | 705/14.23 |

OTHER PUBLICATIONS

Stremersch, Stefan, and Tellis, Gerard J., "Strategic Bundling of Products and Prices: A New Synthesis for Marketing", J. of Marketing, v 66 (Jan. 2002): 55-72.*
Definition of "listing", downloaded Mar. 15, 2013 from http://www.merriam-webster.com/dictionary/listing.*

* cited by examiner

*Primary Examiner* — Donald L. Champagne
(74) *Attorney, Agent, or Firm* — Schwegman, Lundberg & Woessner, P.A.

(57) ABSTRACT

Methods and systems for enabling multi-merchant coupon campaigns within an online publication system are described. In an example, a method can include generating an item listing, receiving information specifying a set of coupon criteria, detecting an event within a multi-merchant publication system, and present a coupon in response to detecting the event. The generating an item listing can be based on information received from a merchant-computer. If the set of coupon criteria is detected it can result in presenting a coupon for the item listing. The event can satisfy a particular coupon criteria from the set of coupon criteria.

18 Claims, 28 Drawing Sheets

MART

WELCOME RUSSELL (SIGN IN) | BUY | SELL | MY MART

| CATEGORIES ▶ | MOTORS | STORES | DAILY DEAL |

ALL CATEGORIES ▶ [SEARCH] ADVANCED SEARCH

SEARCH RESULTS

| PICTURE | ITEM TITLE | BIDS | PRICE* | SHIPPING | TIME |
|---|---|---|---|---|---|
|  | DLP4 WARCRAFT DVD HD DVD & BLU-RAY 617 | 1 | $10.00 | SEE DETAILS | 729D 19H 4 |
|  | FOLUMCEI HDMI CABLE 15FT 5M PS3 XBOX360 BLURAY 123605  BUY IT NOW | — | $15.00 | 1010 $3.00 | 19D 17H 21 |
|  | SAMSUNG BDP-1500 BLU-RAY DVD PLAYER MODEL BDP1500 1080P  BUY IT NOW | — | $148.00 | $14.99 | 19D 17H 21 |
|  | DLP4 WARCRAFT DVD HD DVD & BLU-RAY 617 STD 2 TESTING  BUY IT NOW | 0 | $777.00 | $2.10 | 729D 18H 43 |

ABOUT MART | ANNOUNCEMENTS | SECURITY CENTER | RESOLUTION CENTER | MART TOOLBAR | POLICIES | GOVERNMENT RELATIONS | SITE MAP | HELP

*Fig. 10*

MART   WELCOME RUSSELL (SIGN IN)                                    BUY | SELL

| CATEGORIES ▶ | MOTORS | STORES | DAILY DEAL |

[ ALL CATEGORIES ▼ ]   [ SEARCH ]   ADVANCED SEARCH

SAMSUNG BDP-1500 BLU-RAY DVD PLAYER MODEL BDP1500 1080P

VIEW FULL DESCRIPTION

BUY IT NOW PRICE:   US $148.00   [ BUY IT NOW ]  ~1110
                                 CLICK HERE TO SEE
                                 MONEY SAVING COUPONS

CRD TIME:         SEP-10-09 02:00:51 PDT
SHIPPING COSTS:   US $14.99
                  FLET
SHIPS TO:         UNITED STATES
ITEM LOCATION:    SAN JOSE, CA
HISTORY:          PURCHASES

YOU CAN ALSO:     [ WATCH THIS ITEM ]

MEET THE SELLER

SELLER:   CEXTERISATMART (7000 ☆)
FEEDBACK 100.0% POSITIVE
□ SEE DETAILED FEEDBACK
□ ASK SELLER A QUESTION
□ ADD TO FAVORITE SELLERS
□ VIEW SELLER'S OTHER ITEMS

BUY SAFELY
1. CHECK THE SELLER'S REPUTATION
   SCORE: 7000 100.0% POSITIVE
   SEE DETAILED FEEDBACK
2. CHECK HOW YOU'RE PROTECTED
   ♡ BUY WITH CONFIDENCE

*Fig. 11*

10% OFF
MAX. DISCOUNT
$25

DEXTERISBND

FROM DEXTERISATMART
VALID TILL JUN 15, 2009

FIRST TIME BUYER COUPON

1. DISCOVER THE JOY OF SHOPPING WITH ME. GET 10% DISCOUNT ON THIS BLU-RAY DVD PLAYER.

2. THE COUPON CODE IS DEXTERISBND.

3. TERMS AND CONDITIONS APPLY

FOR HELP, CHECK FAQS OR CONTACT CUSTOMER SUPPORT

---

25% OFF
MAX. DISCOUNT
$30

DEXTERDERFS

FROM DEXTERISATMART
VALID TILL JUN 15, 2009

*REDEEMING YOUR COUPON IS EASY!

1. BUY BOTH THE HDMI CABLE AND PLANET EARTH – BLU-RAY DISC ALSO WITH THIS PURCHASE TO GET 25% DISCOUNT ON HDMI CABLE AND PLANET EARTH – BLU-RAY DISC.

2. THE COUPON CODE IS DEXTERDERFS

3. TERMS AND CONDITIONS APPLY

FOR HELP, CHECK FAQS OR CONTACT CUSTOMER SUPPORT

*Fig. 12A*

| MAX. DISCOUNT | FROM DEXTERISATMART | 3. TERMS AND CONDITIONS APPLY |
| $25 | VALID TILL JUN 15, 2009 | FOR HELP, CHECK FAQS OR CONTACT CUSTOMER SUPPORT |

*REDEEMING YOUR COUPON IS EASY!

1. BUY BOTH THE HDMI CABLE AND PLANET EARTH – BLU-RAY DISC ALSO WITH THIS PURCHASE TO GET 25% DISCOUNT ON HDMI CABLE AND PLANET EARTH – BLU-RAY DISC.

2. THE COUPON CODE IS DEXTERDERFS

3. TERMS AND CONDITIONS APPLY

FOR HELP, CHECK FAQS OR CONTACT CUSTOMER SUPPORT

| 25% OFF | DEXTERDERFS | *REDEEMING YOUR COUPON IS EASY! |
| MAX. DISCOUNT $40 | FROM DEXTERISATMART VALID TILL JUN 15, 2009 | 1. BUY HDMI CABLE ALSO WITH THIS PURCHASE TO GET 40% DISCOUNT ON HDMI CABLE |

40% OFF    DEXTERDER

Fig. 12B

MART

REVIEW AND COMMIT TO BUY

HELLO RUSSELL (NOT YOU?)

ITEM YOU'RE BUYING
SAMSUNG BDP-1500 BLU-RAY DVD PLAYER MODEL BDP 1500 1080P

BUY IT NOW PRICE: US $148.00

SHIPPING AND HANDLING: US $14.99 -- FLAT
PAYMENT METHODS: PAYPAL

BY CLICKING ON THE BUTTON BELOW, YOU COMMIT TO BUY THIS ITEM FROM THE SELLER.

[COMMIT TO BUY]

CLICK HERE TO SEE MONEY SAVING COUPONS ⌐1310

YOU ARE AGREEING TO A CONTRACT -- YOU WILL ENTER INTO A LEGALLY BINDING CONTRACT TO PURCHASE THE ITEM FROM THE SELLER. YOU ARE RESPONSIBLE FOR PAYMENT METHODS. SELLER ASSUMES ALL RESPONSIBILITY FOR LISTING THIS ITEM.

*Fig. 13*

SHIPPING ADDRESS CHANGE

RUSSEL CROWE
2125 HAMILTON AVE.
SAN JOSE, CA 95125
UNITED STATES
(650)614-5457

ORDER DETAILS

| ITEM TITLE | SHIPPING AND HANDLING | QUANTITY | PRICE |
|---|---|---|---|
| SELLER: DEXTERSATMART (7000 ☆) <br> SAMSUNG BDP-1500 BLU-RAY DVD PLAYER MODEL BDP1500 1080P <br> 14001162173 - PRICE US $148.00 $133.20 | UPS GROUND: US $14.99 <br> ESTIMATED DELIVERY: 4-3 BUSINESS DAYS* | 1 | US $162.99 $148.19 |

AS A FIRST TIME BUYER YOU SAVED US $14.80 ON THIS PURCHASE

⊞ MESSAGE TO DEXTERISATMART [ADD MESSAGE]

DEALS FOR YOU

- BUY BOTH THE HDMI CABLE AND PLANET EARTH – BLU-RAY DISC ALSO WITH THIS PURCHASE TO GET 25% DISCOUNT ON HDMI CABLE AND PLANET EARTH – BLU-RAY DISC. [TRY THIS DEAL]  SHOW COUPON
- BUY PLANET EARTH – BLU-RAY DISC ALSO WITH THIS PURCHASE TO GET 20% DISCOUNT ON PLANET EARTH – BLU-RAY DISC. [TRY THIS DEAL]  SHOW COUPON
- BUY HDMI CABLE ALSO WITH THIS PURCHASE TO GET 10% DISCOUNT ON HDMI CABLE. [TRY THIS DEAL]  SHOW COUPON

DEALS FOR YOU

- BUY BOTH THE HDMI CABLE AND PLANET EARTH – BLU-RAY DISC ALSO WITH THIS PURCHASE TO GET 25% DISCOUNT ON HDMI CABLE AND PLANET EARTH – BLU-RAY DISC. [SHOW COUPON]
  [REMOVE THIS DEAL] ~1510

- BUY PLANET EARTH – BLU-RAY DISC ALSO WITH THIS PURCHASE TO GET 20% DISCOUNT ON PLANET EARTH – BLU-RAY DISC. [SHOW COUPON]
  [TRY THIS DEAL]

- BUY HDMI CABLE ALSO WITH THIS PURCHASE TO GET 40% DISCOUNT ON HDMI CABLE. [SHOW COUPON]
  [TRY THIS DEAL]

1520

ITEMS RELATED TO THE DEAL

| ITEM TITLE | PRICE |
|---|---|
| PLANET EARTH – THE COMPLETE COLLECTION (DVD, 2007)<br>PRICE: US $50.00 $37.50<br>UPS GROUND: US $3.00 $0 | US $53.00 $37.50 |
| FOLIUMCEI HDMI CABLE 15FT 5M PS3 XBOX360 BLURAY 123605<br>PRICE: US $15.00 $11.25<br>UPS GROUND: US $3.00 $0 | US $18.00 $11.25 |

YOU SAVE US $23.75 WITH THIS DEAL.

BY COMBINING THE PURCHASES, YOUR COST TO SHIP THESE ITEMS IS $0.

[COMMIT TO BUY]

*Fig. 15*

| ITEMS RELATED TO THE DEAL | |
|---|---|
| ITEM TITLE | PRICE |
| PLANET EARTH – THE COMPLETE COLLECTION (DVD, 2007)<br>PRICE: US $50.00 $40.00<br>UPS GROUND: US $3.00 $1.50 | US $53.00 $41.50 |

YOU SAVE US $11.50 WITH THIS DEAL

[COMMIT TO BUY]

✳ REDEEM A GIFT CARD, CERTIFICATE, OR COUPON (PAYPAL REQUIRED)
ENTER THE REDEMPTION CODE FOR YOUR GIFT CARD, CERTIFICATE, OR COUPON.

[          ]  [APPLY]

| | |
|---|---|
| SUBTOTAL: | US $148.00 |
| SHIPPING & HANDLING: | US $14.99 |
| DISCOUNT AMOUNT: | US –$14.80 |
| TOTAL: | US $148.19 |

*THE ESTIMATED DELIVERY TIME IS BASED ON THE SELLER'S HANDLING TIME, THE SHIPPING SERVICE SELECTED, AND THE PAYMENT METHOD SELECTED.

[CONTINUE]

DEALS FOR YOU

- BUY BOTH THE HDMI CABLE AND PLANET EARTH– BLU-RAY DISC ALSO WITH THIS PURCHASE TO GET 25% DISCOUNT ON HDMI CABLE AND PLANET EARTH– BLU-RAY DISC.
  [TRY THIS DEAL]   SHOW COUPON

- BUY PLANET EARTH – BLU-RAY DISC ALSO WITH THIS PURCHASE TO GET 20% DISCOUNT ON PLANET EARTH – BLU-RAY DISC.
  [REMOVE THIS DEAL]   SHOW COUPON

- BUY HDMI CABLE ALSO WITH THIS PURCHASE TO GET 40% DISCOUNT ON HDMI CABLE.
  [TRY THIS DEAL]   SHOW COUPON

*Fig. 18*

| ITEMS RELATED TO THE DEAL | |
|---|---|
| ITEM TITLE | PRICE |
| FOJUNCEI HDMI CABLE 15FT<br>5M PS3 XBOX360 BLURAY<br>123605<br>PRICE: US $15.00 $9.00<br>UPS GROUND: US $3.00 $1.50 | US $18.00 $10.50 |
| YOU SAVE US $7.50 WITH THIS DEAL | |
| COMMIT TO BUY | |

| DEALS FOR YOU | |
|---|---|
| • BUY BOTH THE HDMI CABLE AND PLANET EARTH– BLU-RAY DISC ALSO WITH THIS PURCHASE TO GET 25% DISCOUNT ON HDMI CABLE AND PLANET EARTH– BLU-RAY DISC.<br>TRY THIS DEAL | SHOW COUPON |
| • BUY PLANET EARTH – BLU-RAY DISC ALSO WITH THIS PURCHASE TO GET 20% DISCOUNT ON PLANET EARTH – BLU-RAY DISC.<br>TRY THIS DEAL | SHOW COUPON |
| • BUY HDMI CABLE ALSO WITH THIS PURCHASE TO GET 40% DISCOUNT ON HDMI CABLE.<br>REMOVE THIS DEAL | SHOW COUPON |

REDEEM A GIFT CARD, CERTIFICATE, OR COUPON (PAYPAL REQUIRED)
ENTER THE REDEMPTION CODE FOR YOUR GIFT CARD, CERTIFICATE, OR COUPON.

[          ]  APPLY

| | |
|---|---|
| SUBTOTAL: | US $148.00 |
| SHIPPING & HANDLING: | US $14.99 |
| DISCOUNT AMOUNT: | US –$14.80 |
| TOTAL: | US $148.19 |

*THE ESTIMATED DELIVERY TIME IS BASED ON THE SELLER'S HANDLING TIME, THE SHIPPING SERVICE SELECTED, AND THE PAYMENT METHOD SELECTED.

METHODS AND SYSTEMS FOR MULTI-MERCHANT COUPONING

CLAIM OF PRIORITY

This application claims the benefit of U.S. Provisional Application Ser. No. 61/305,466, filed Feb. 17, 2010, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, eBay, Inc. All Rights Reserved.

TECHNICAL FIELD

This application relates generally to transactions over a distributed network, and more specifically to methods and systems for enabling a multi-merchant couponing system within a network-based publication system

BACKGROUND

Traditional paper coupons delivered through the mail or in the newspaper have been used by organizations for years to incent desired customer behaviors. The basic delivery mechanisms for traditional coupons have changed little over the years even as new technologies have altered the way the typical consumer receives purchase information and makes purchase decisions.

The advent of the Internet has driven the development of new methods of delivering information to consumers and provided marketers additional avenues for delivering promotional information, such as electronic mail. The ease and relatively low cost of sending out electronic promotional information has led to a dramatic increase in the amount of promotional information received by the average consumer. Interestingly, most promotional information remains completely anonymous, untargeted, and generally ignored by the recipient. Some efforts at personalization and targeted marketing have been developed through mechanisms such as opt-in electronic mail programs.

As part of the electronic marketing revolution driven primarily by the ease of communication over the Internet, coupon delivery has also moved online. However, other than the mechanism of delivery, coupons have changed little in the transition to electronic delivery. Coupons remain anonymous promotions targeted at large groups of consumers. Even coupons delivered through some sort of opt-in electronic marketing campaign will be redeemable by anyone that receives the offer.

BRIEF DESCRIPTION OF THE DRAWINGS

Some embodiments are illustrated by way of example and not limitation in the figures of the accompanying drawings in which:

FIG. 10 is a user interface screen illustrating an example search results page containing item listings with merchant coupons associated.

FIG. 11 is a user interface screen illustrating an example view item (VI) page containing a link to a merchant coupon.

FIGS. 12A-C are user interface screens illustrating example pop-up coupon display windows depicting example merchant coupons.

FIG. 13 is a user interface screen illustrating an example purchase page containing a link to a merchant coupon.

FIG. 14A-14B are user interface screens illustrating example virtual shopping cart pages containing additional offers from a merchant.

FIG. 15 is a user interface screen illustrating an example additional offers selection page.

FIG. 18 is a user interface screen illustrating an example additional merchant offers purchase page including a total price display.

FIG. 19 is a user interface screen illustrating an example additional merchant offers purchase page including a total price display.

DETAILED DESCRIPTION

Figure 1:
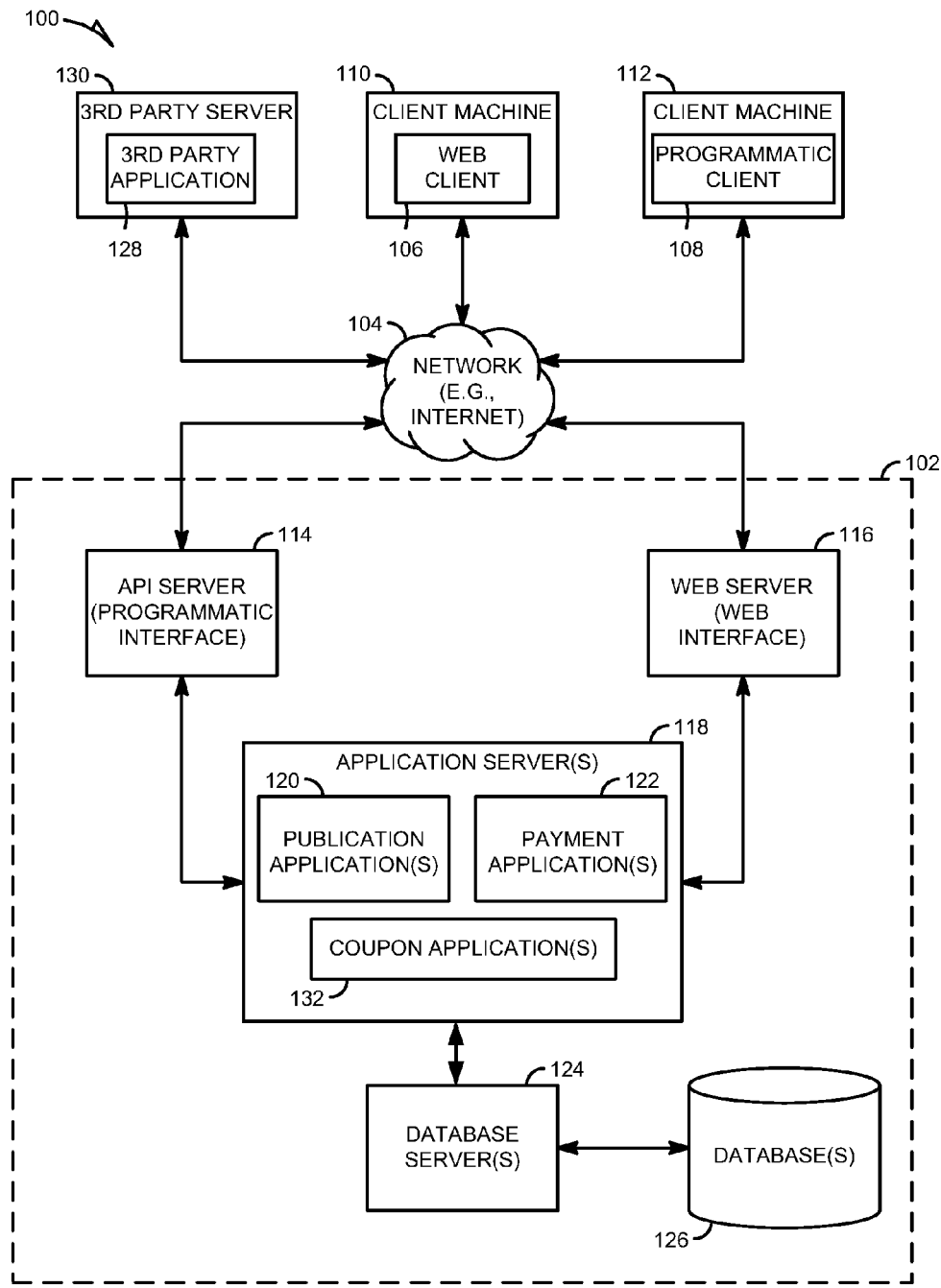
FIG. 1 is a block diagram illustrating an example architecture for a network-based publication system within which methods and systems for multi-merchant couponing can be implemented.

Example methods and systems to enable merchants within a network-based publication system to target users with coupon offers are described. The systems and methods for allowing merchants to target users with coupon offers, in some example embodiments may provide a user with a coupon while browsing a network-based publication system. In the following description, for purposes of explanation, numerous specific details are set forth in order to provide a thorough understanding of example embodiments. It will be evident, however, to one skilled in the art that the present invention may be practiced without these specific details. It will also be evident, that coupon issuance is not limited to the examples provided and may include other scenarios not specifically discussed.

In accordance with an example embodiment, the system can issue a real-time coupon to a user that fits one or more specified criteria while still on the network-based publication system (also referred to as the "site"), such as for example a network-based marketplace, a network-based store, or other commerce enabling system. In this example, a real-time coupon refers to a coupon issued to a user during a session browsing a network-based publication system. In the context of coupon generation and delivery, both real-time and instantaneous refer to the generation and/or delivery occurring immediately. However, in the context of any computerized system "immediately," "real-time," or "instantaneous" are all constrained by the time it takes for the process under computer control to occur. In an example, the criteria can include a previous purchase by the user, the user's gender, or a combination of similar parameters. In some examples, the criteria can be the performance of certain actions by the user on the site, which can be monitored in real-time. For example, on a network-based publication system, entering a search request can result in a listing of search results where some of the results can have associated coupon offers provided by the merchant's responsible for the listing. In additional examples, actions targeted by merchants for coupon offers can include buying an item associated with an up-selling campaign, winning an "competitive" auction (e.g., an auction with multiple bids from the same bidder(s)), or buying an item associated with featured accessories. In some examples, the user's actions are monitored in real-time on the site. In certain examples, the user's actions are derived from analyzing historical transaction data. The historical transaction data can be analyzed in regular batches (e.g., daily or weekly). In an example, the user's actions can be determined from a combination of monitored activity and historical transaction data analysis. In some additional examples, criteria for issuing a coupon to the user can also include user profile data, which can include demographics tracked by the network system.

Various methods can be used to select users to be eligible to received coupons while browsing on the site. For example, coupon issuance models can be developed based on historical transaction data from a network-based publication system. These historical coupon issuance models can then be applied to users' activity using the site. The coupon issuance model can include rules or conditions that the user must satisfy, such as the user purchased an item in a specified category or the purchase price for the purchased item is at least a specified dollar amount. The following is a list of example rules that can be included in a coupon issuance model:

The user purchased an item using a coupon (or not using a coupon).
The previous M item(s) that the user purchased were not paid with a coupon in the last D1 days.
The user has made less than T purchases in the last D2 days.
The user has redeemed less than K coupons within the same campaign in the last D3 days.
The user has any outstanding payments (or not). An outstanding payment is defined as:
  Any incomplete or pending payment of won items in the past 2 weeks.
  The number of successful bids is not equal to the number of completed payments in the last 2 weeks.
The user has any live bids (or not). This is defined as:
The user is the highest bidder on any live auction.
The end date of this live auction is prior to the expiration date of the dynamic issuance coupon that will be issued.
The user is a rewards or loyalty program participant (or not).

Additionally, lists of eligible users can be created based on demographics or the individual user's purchase history. User demographics can include age, gender, income level, race, education, hobbies, or any personal characteristic that may be collected or recorded about an individual user. In certain examples, an administrative interface is provided to allow creation of eligible user lists.

Once the system determines a coupon is going to be issued to a user, it can be presented within the network-based publication system through various avenues. For example, the coupon could be delivered to the user through some sort of on-site messaging system, such as while the user is viewing an item relevant to the coupon. A coupon can also be surfaced within the user's account page. The network-based publication system's web interfaces is configurable to provide visual indications of a coupon, such as through a page header common across multiple pages of the site. In certain examples, the coupon may be issued and surfaced during the check out process.

In one example embodiment, the merchant can target users with coupons targeted specifically at the user. Targeted variable value coupons can be used for user-specific, targeted incentives related to rewards programs and courtesy coupon programs. Merchants can create coupons with different discount amounts, percentage discounts, and expiration dates for individual users. In some embodiments, the targeted coupon can only be redeemed by the user to whom it was issued. In certain examples each individual user can be assigned a unique coupon redemption code. In some examples, the targeted coupons are redeemed based on the user's login credentials with the network-based publication system. In other examples, the targeted coupons are redeemed based on the user's email address. In yet other examples, the targeted coupons are redeemed through the user's method of payment, such as via PayPal™ online payment services (from eBay Inc. of San Jose, Calif.) or a credit card.

In some examples, a merchant's coupon campaigns are controlled through a campaign management tool. The campaign management tool allows a merchandiser, marketing person, or individual merchant to control the approximate dollar amount of coupons issued through the system. The campaign management tool also allows for control over the coupon campaign's start and end dates, as well as coupon expiration dates. The campaign management tool can be implemented as a stand-alone web application used to submit coupon metadata to a coupon infrastructure hosted by the network-based publication system. As individual unique coupons are issued to each eligible user, the campaign management tool can provide the capability to suspend or cancel individual coupons or an entire campaign.

Further details regarding the various example embodiments described above will now be discussed with reference to the figures accompanying the present specification.

Platform Architecture

FIG. 1 is a block diagram illustrating an example architecture for a network-based publication system within which methods and systems for dynamically issuing coupons can be implemented. The block diagram depicting a client-server system 100, within which an example embodiment can be deployed. A networked system 102, in the example forms of a network-based marketplace, on-line retail site, or publication system, provides server-side functionality, via a network 104 (e.g., the Internet or Wide Area Network (WAN)) to one or more clients 110, 112. FIG. 1 illustrates, for example, a web client 106 (e.g., a browser, such as the INTERNET EXPLORER browser developed by Microsoft Corporation of Redmond, Wash.), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more publication applications 120, payment applications 122, and coupon applications 132. The application servers 118 are, in turn, shown to be coupled to one or more databases servers 124 that facilitate access to one or more databases 126. In some examples, the application server 118 can access the databases 126 directly without the need for a database server 124.

The publication applications 120 may provide a number of publication functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the publication system applications 120. The payment application 122 may also be configured to allow for the redemption of coupons issued by the coupon applications 132. The coupon applications 132 may provide a number of coupon related services and functions to users. The coupon applications 132 may be configured to issue coupons directly to users of the networked system 102. Additionally, the coupon applications is configurable to send coupons to users via communication channels external to the networked system 102, such as electronic mail or even standard postal mail. The coupon applications 132 may also be response for surfacing coupons within the networked system 102 during a user session. Surfacing (or presenting) coupons to a user can be done in a manner that is contextually relevant to the portion of the networked system 102 currently being interacted with by the user. The coupon applications 132 may also be response for providing individual merchants control over coupon campaign parameters and user targeting instructions (rules). While the publication, payment, and coupon applications 120, 122 and 132 are shown in FIG. 1 to all form part of the networked system 102, it will be appreciated that, in alternative embodiments, the payment applications 122 may form part of a payment service that is separate and distinct from the networked system 102.

Further, while the system 100 shown in FIG. 1 employs client-server architecture, the present invention is of course not limited to such an architecture, and could equally well find application in a distributed, or peer-to-peer, architecture system, for example. The various publication, payment, and coupon applications 120, 122 and 132 could also be implemented as standalone software programs, which do not necessarily have networking capabilities.

The web client 106 accesses the various publication, payment, and coupon applications 120, 122 and 132 via the web interface supported by the web server 116. Similarly, the programmatic client 108 accesses the various services and functions provided by the publication, payment, and coupon applications 120, 122 and 132 via the programmatic interface provided by the API server 114. The programmatic client 108 may, for example, be a seller application (e.g., the TURBOLISTER application developed by eBay Inc., of San Jose, Calif.) to enable sellers to author and manage listings on the networked system 102 in an off-line manner, and to perform batch-mode communications between the programmatic client 108 and the networked system 102. Programmatic clients 108 can also be provided that enable sellers to author and manage coupons and coupon campaigns on the networked system 102 in either an on-line or off-line mode.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, publication or payment functions that are supported by the relevant applications of the networked system 102. Additionally, the third party website may provide a user access to view coupons issued by the networked system 102 through the coupon applications 132.

Publication Applications

Figure 2:
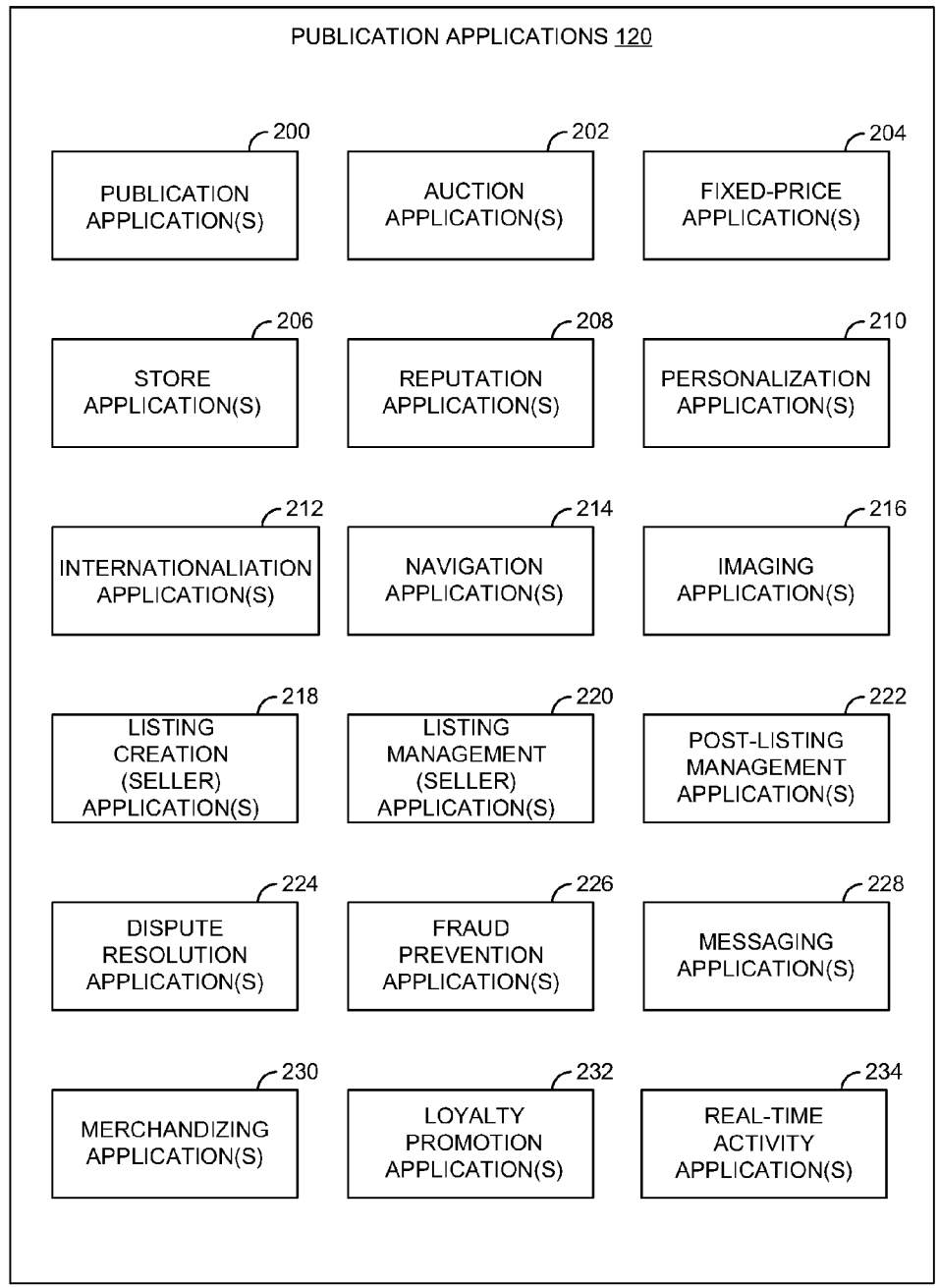
FIG. 2 is a block diagram illustrating multiple applications that, in one example embodiment, can be provided as part of the network-based publication system that enables multi-merchant couponing, among other things.

FIG. 2 is a block diagram illustrating multiple applications 120 that, in an example embodiment, are provided as part of the networked system 102. The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 128.

The networked system 102 may provide a number of publishing, listing and price-setting mechanisms whereby a seller (merchant) may list (or publish information concerning) goods or services for sale, a buyer can express interest in or indicate a desire to purchase such goods or services, and a price can be set for a transaction pertaining to the goods or services. To this end, the publication applications 120 may include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller or merchant. Such a virtual store may also offer promotions, incentives and features that are specific and personalized to a relevant seller. The coupon applications 132 or coupon modules 314 are configurable to provide coupon related services through the store applications 206 to individual sellers. In this example, individual sellers can access many of the coupon related functions described herein. For instance, through the coupon applications 132 a seller can create a coupon campaign specific to the seller's personalized "virtual" store.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. A personalized reference page is configurable to display all coupons issued to the user by one of the coupon applications 132 or stored within the coupon infrastructure 304. Further, a personalization application 210 may enable a user to personalize listings and other aspects of their interactions with the networked system 102 and other parties. Additionally, a personalization application can enable a user to view and organize coupons issued by the publication system or individual merchants within the publication system.

The networked system 102 may support a number of publication systems that are customized, for example, for specific geographic regions. A version of the networked system 102 may be customized for the United Kingdom, whereas another version of the networked system 102 may be customized for the United States. Each of these versions may operate as an independent publication system, or may be customized (or internationalized) presentations of a common underlying publication system. The networked system 102 may accordingly include a number of internationalization applications 212 that customize information (and/or the presentation of information) by the networked system 102 according to predetermined criteria (e.g., geographic, demographic or publication system criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications. Certain navigation applications may be configured to surface coupons relevant to the search or browsing pages delivered in response to a user's query.

In order to make listings, available via the networked system 102, as visually informing and attractive as possible, the publication system applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102 and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). The messaging applications 228 can also be used to deliver coupons generated by the coupon applications 132 to users on the networked system 102. Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks. The messaging applications 228 may also be configured to communicate over certain social networking platforms, such as Twitter or Facebook. Communication with a social networking platform may require installation of an application or plug-in within a user's social network account.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers. The merchandising applications 230 may also provide an additional mechanism for sellers to create and manage coupon campaigns within the networked system 102.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and the buyer may be offered a reward for which accumulated loyalty points can be redeemed. The loyalty promotion applications 232 may work in conjunction with the coupon applications 132 to reward loyal users with valuable coupons for use within the networked system 102.

Real-time activity applications 234 support various functions within the networked system 102 by providing real-time information about user activities within the networked system 102. For example, the real-time activity applications 234 can provide information to the messaging applications 228 or personalization applications 210 to enhance a user's experience or improve a seller's ability to move merchandise. In certain examples, the real-time activity applications 234 provide real-time activity data to the coupon applications 132 enabling real-time, instantaneous delivery of user targeted coupons. Real-time activity data, delivered by the real-time activity applications 234, may also be used to coordinate delivery of coupons within the networked system 102 and through external communications channels supported by the messaging applications 228. The real-time activity data can also be used to trigger contextual display of coupons already issued to the user. For example, if the user is viewing an item listing for a digital camera, this information can be provided to the coupon applications 132, which can then trigger the display of a coupon from a seller specializing in digital cameras.

Merchant Couponing Modules

Figure 3:
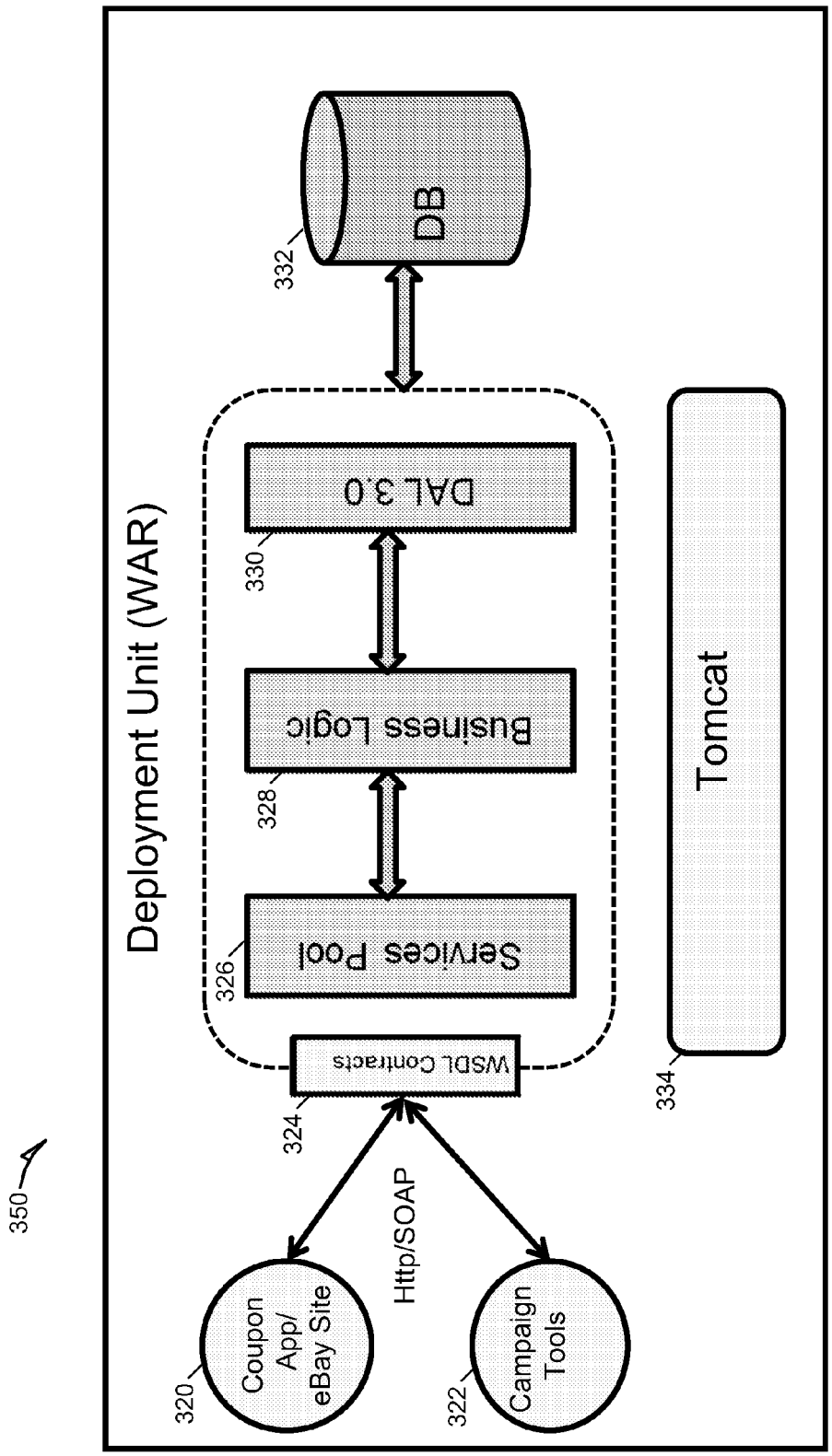
FIG. 3 is a block diagram illustrating an example system for enabling multi-merchant couponing.

FIG. 3 is a block diagram illustrating an example merchant couponing system 350. In this example, the system 350 includes a publishing or marketplace site 320, coupon campaign tools 322, a backend interface 324, a services pool 326, a business logic component 328, a data access layer 330, a database 332, and a web application server 334. The database 332 can be a relational database. The database 332 can be used to store configuration data, user data and coupon transactional data. The database can also be used to store coupon rules and promotional cross sell and up-sell campaign data.

Figure 4:
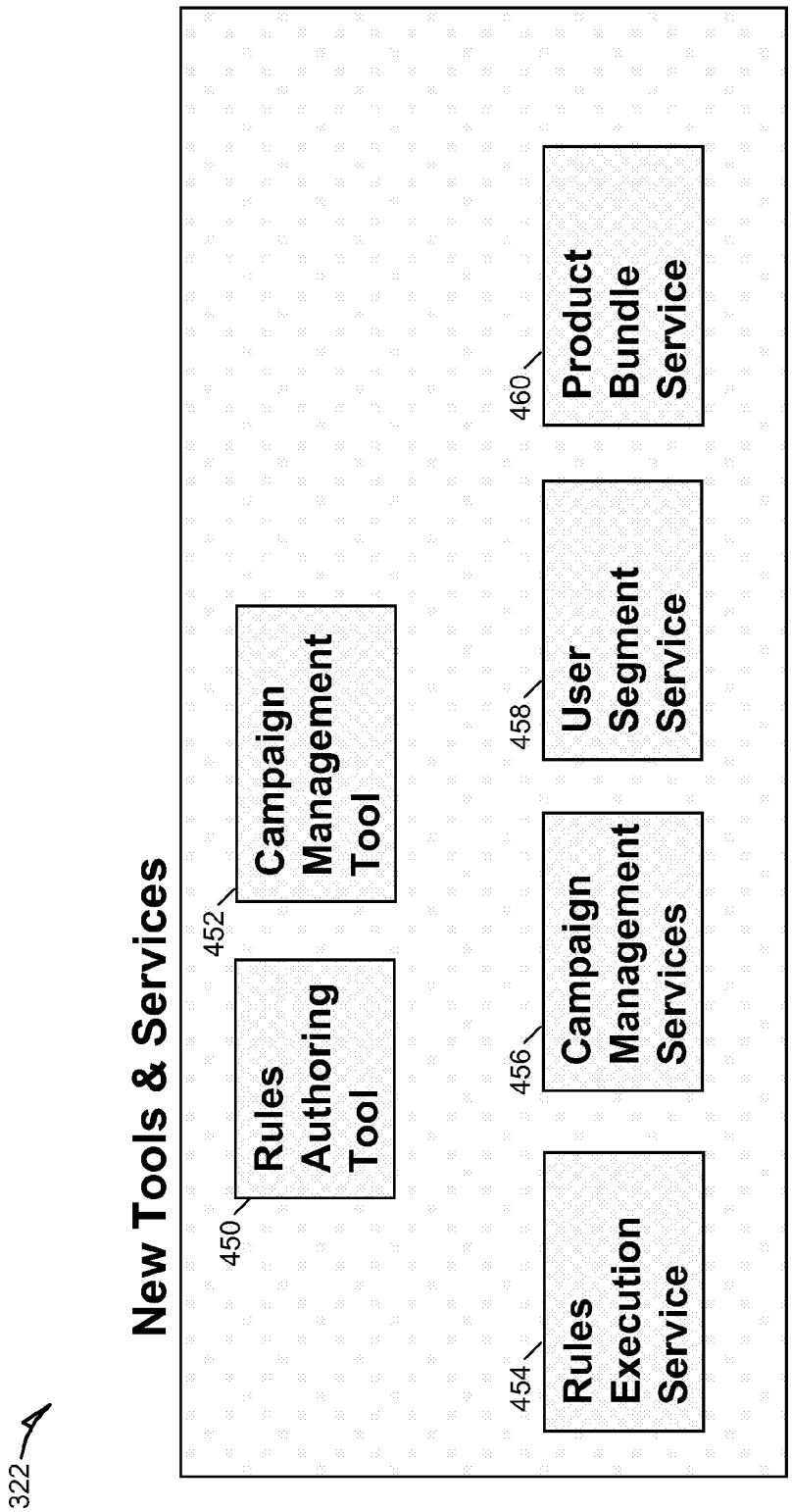
FIG. 4 is a block diagram illustrating example support systems, which can be used to implement multi-merchant couponing as part of a network-based publication system.

FIG. 4 is a block diagram illustrating an example set of coupon campaign tools 322, according to an example embodiment. The campaign tools 322 can include a rules authoring tool 450, a campaign management tool 452, a rules execution service component 454, a campaign management service component 456, a user segment service component 458, and a product bundle service component 460.

In an example, the rules authoring tool 450 can provide an interface for merchants to create rules to target individual users or segments of users with coupon offers. The rules authoring tool 450 allows a merchant to create business logic to be executed as users browse within the publication system in real-time. The business logic can range from simple, (e.g., IF Attribute X=2 THEN 20% Off) to complex instructions involving multiple parameters and real-time behavioral analysis. In certain examples, the rules authoring tool 450 allows instructions to be authored in common programming languages, such as Java™ or BASIC.

In an example, the campaign management tool 452 provides merchants an interface to input the parameters of a particular coupon campaign. One coupon campaign parameter may be a set of rules created within the rules authoring tool 450. Other coupon campaign parameters can include start date, end date, budget, and target product categories, among others. Coupon campaign parameters can be stored within the database 332.

In an example, the rules execution service module 454 is responsible for execution of a merchant's coupon targeting rules during the course of a coupon campaign. The campaign management services module 456 can provide general runtime management services, such as monitoring the campaign budget as coupons are issued and then redeemed. The user segment service module 458 can provide user tracking services related to coupon issuance and redemption. The product bundle service module 460 can provide services to match merchant product bundling offers to products or services a user is in the process of purchasing. For example, if a user is in the process of buying a digital camera and the merchant also sells memory cards and add-on lenses, the product bundle service module 460 can create bundled offerings to display during checkout.

Merchant Couponing Methods

Figure 5:
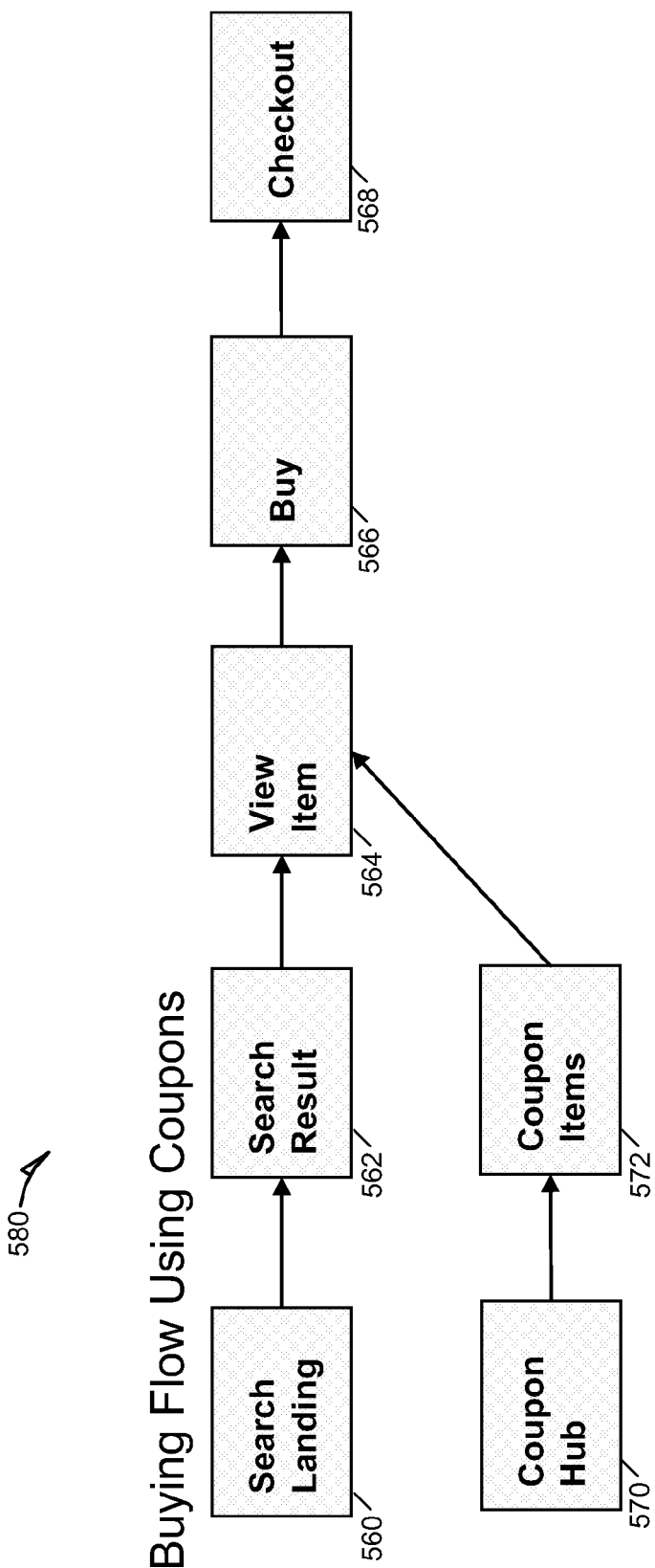
FIG. 5 is a flow chart illustrating an example method for purchasing an item with an associated merchant coupon.

FIG. 5 is a flow chart illustrating an example method 580 for purchasing an item with an associated merchant coupon. The method 580 includes operations for search landing 560, search result 562, viewing an item 564, purchasing an item 566, checking out a purchase 568, coupon hub 570, and coupon items 572. In an example, the method 580 begins at 560 with a user entering a search result. At 562, the system displays a set of search results 562. In this example, the method 580 continues at 564 when a user selects on of the search results for viewing. If the item being viewed at 564 has an associated merchant coupon, the 580 associates one of the coupon items 572. The method 580 finishes at 566 and 568 with the user purchasing and checking out the product. As depicted in user interface screens shown in FIGS. 14A and 14B, the system can associate additional coupon offers from the merchant during checkout as bundled offerings.

Figure 6:
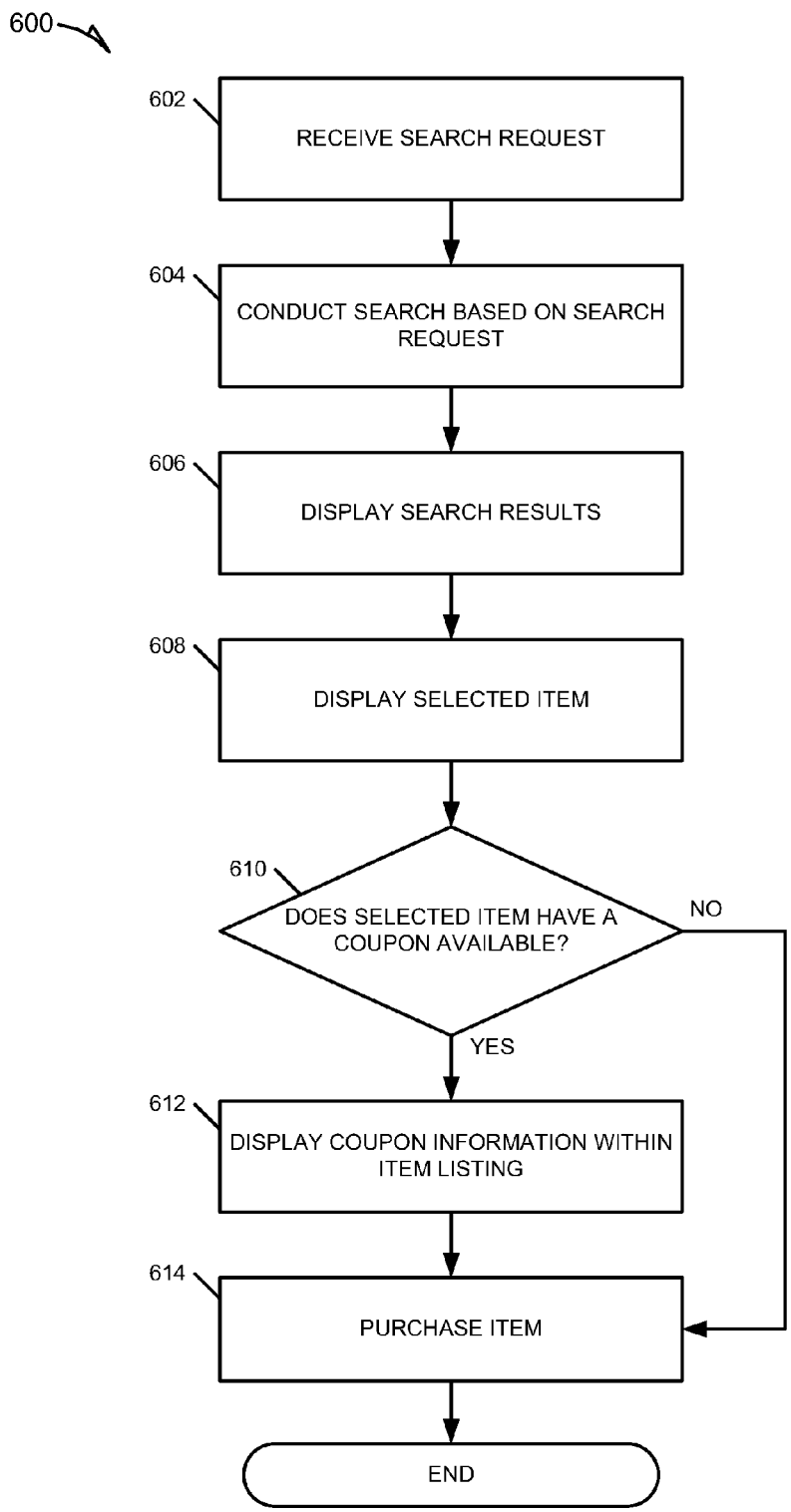
FIG. 6 is a flow chart illustrating an example method for providing merchant supported coupons within a network-based publication system.

FIG. 6 is a flow chart illustrating an example method 600 for providing merchant supported coupons within a network-based publication system. In an example, the method 600 includes operations for receiving a search request at 602, conducting a search based on the search request at 604, displaying search results at 606, displaying a selected item at 608, deciding whether the selected item has an associated merchant coupon at 610, displaying coupon information within an item listing if these is an associated coupon at 612, and purchasing an item at 614.

Figure 7:
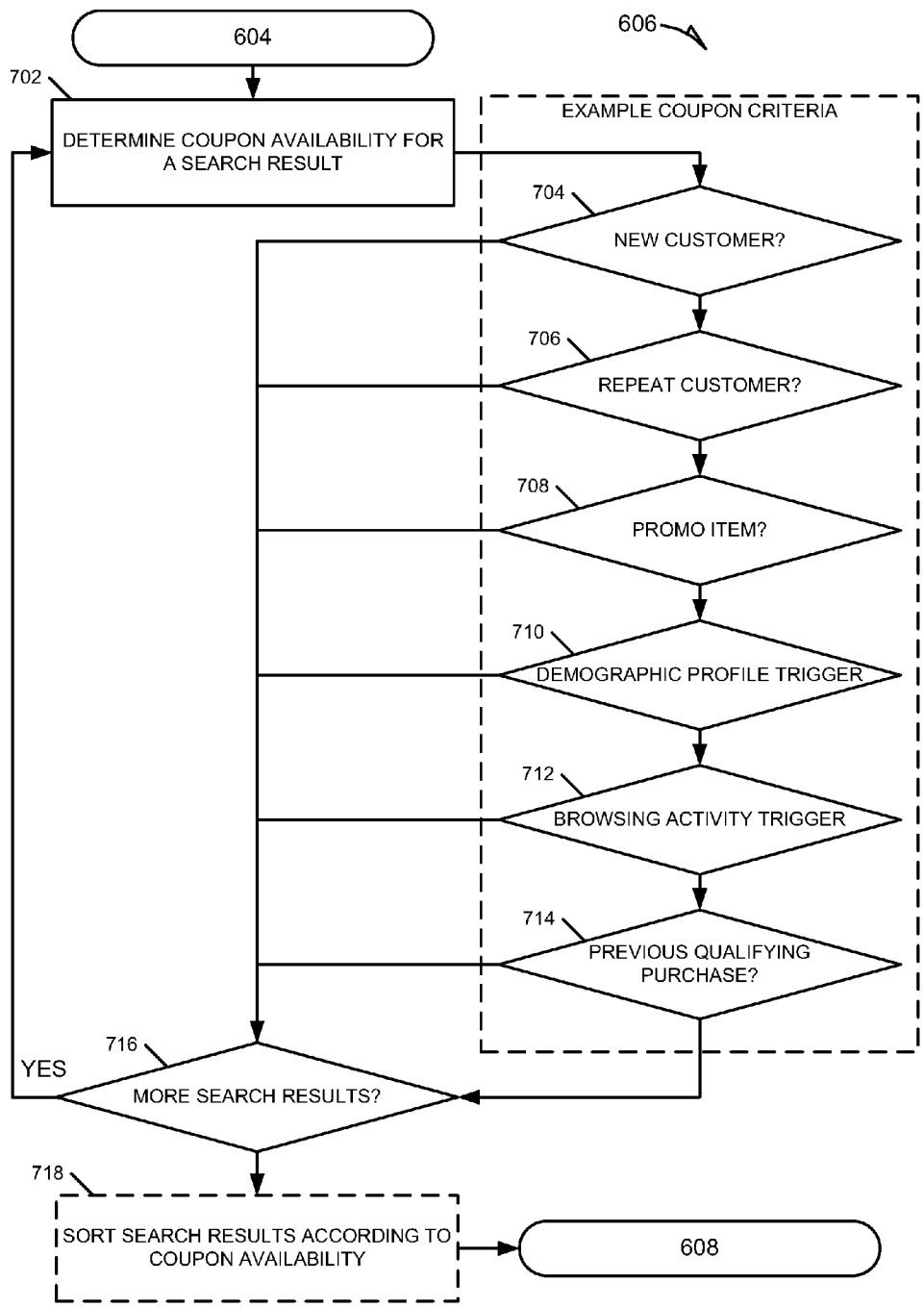
FIG. 7 is a flow chart illustrating an example method for determining merchant coupon availability with a set of search results dynamically issuing a coupon to a user within a network-base publication system.

In an example, the operations depicted in FIG. 7 can be done during operation 606 in order to display merchant coupons associated with some of the search results (see FIG. 10 for a user interface screen illustrating an example set of search results). In some examples, the operations depicted in FIG. 8 can be cone during operation 614 in order to allow merchants to provide users with bundled or additional related offers during the checkout process, as depicted for example in FIG. 16 (discussed below).

FIG. 7 is a flow chart illustrating an example method 606 for determining merchant coupon availability with a set of search results dynamically issuing a coupon to a user within a network-based publication system. In an example, the method 606 includes operations for determining merchant coupon availability for each search result in a set of search results at 702, example coupon criteria at 704-714, determining whether additional search results need to be processed at 716, and optionally sorting the search results according to merchant coupon availability at 718.

In certain examples, the example coupon criteria (704-714) include providing coupons based on the user being a new customer at 704, the user being a repeat customer at 706, the selected search result being a promotional item at 708, another user demographic attribute or set of attributes (profile) matching a merchant coupon rule at 710, user browsing activity (historical or real-time) matching a merchant coupon rule at 712, or the user having made a previous purchase that satisfies a merchant coupon rule at 714. In some examples, merchant couponing rules created within the rules authoring tool 450 can create additional coupon criteria not discussed here.

Figure 8:
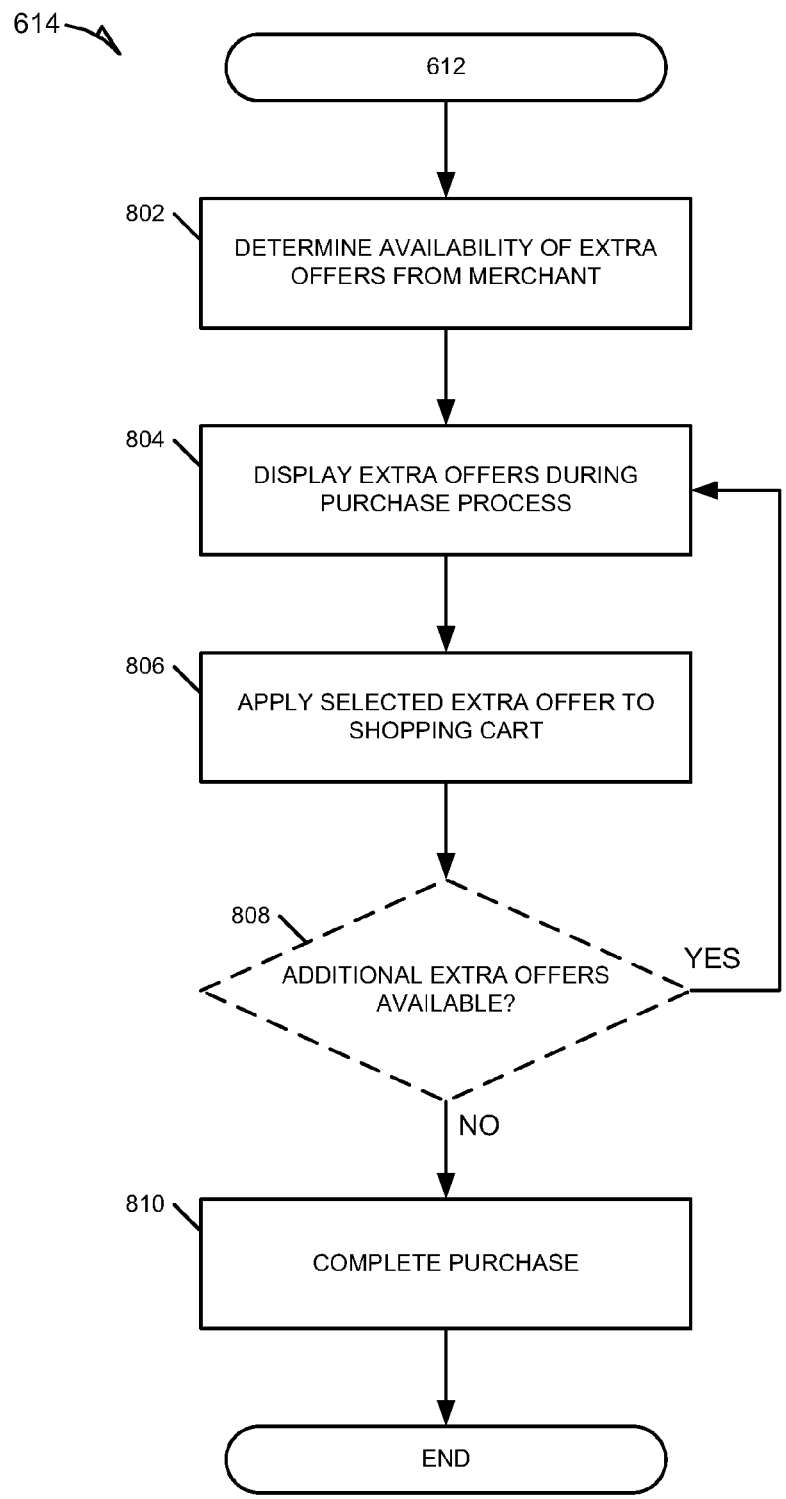
FIG. 8 is a flow chart illustrating an example method for dynamically determining availability of additional offers from a merchant.

FIG. 8 is a flow chart illustrating an example method 614 for dynamically determining availability of additional offers from a merchant. In an example, the method 614 includes operations for determining availability of offers from a merchant associated with one or more of the items a user is purchasing at 802, displaying the extra offers during the purchase process at 804, applying selected extra offer to shopping cart and illustrating savings obtained by the user at 806, determining if additional extra offers are available at 808, and completing the purchase at 810. Some example user interface screens demonstrating the method 614 are included at FIG. 14A-19. In some examples, extra offers can be referred to as bundled offers, as the extra offers bundle a number of accessories or related items. A bundled offer is defined as an offer to sell multiple related items at a discount over the items sold individually.

Merchant Couponing Interface Examples

Figure 9:
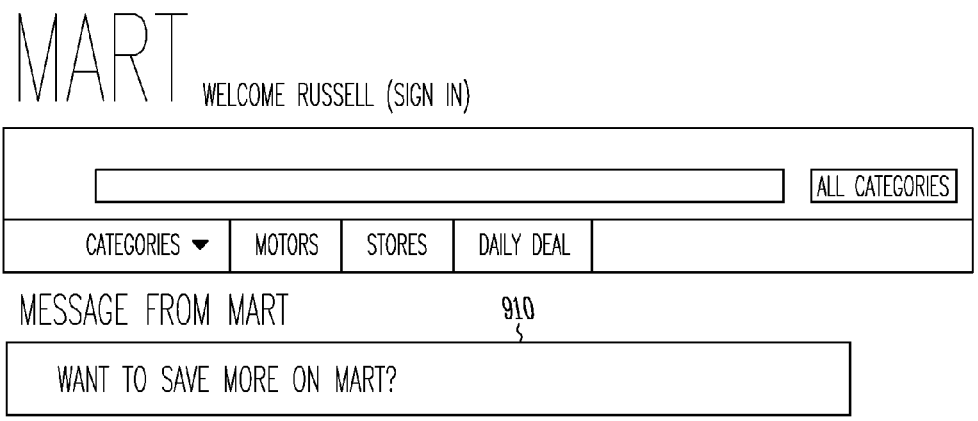
FIG. 9 is a user interface screen illustrating an example login message providing information about multi-merchant couponing.

FIG. 9 is a user interface screen illustrating an example login message 910 providing information about multi-merchant couponing. In this example, the login message 910 is indicating to the user that items with associated merchant coupons will be indicated with "$" (stylized dollar sign) icon. As noted above, search results with associated merchant coupons can be marked with this $ icon to indicate the availability of a merchant coupon on the item. In some examples, different users may receive different coupon offers from different merchants. Merchants can target users based on various metrics and demographic parameters exposed through the coupon campaign tools and services 322 (discussed above in reference to FIG. 4).

FIG. 10 is a user interface screen illustrating an example search results page containing item listings with merchant coupons associated. The user interface (UI) screen depicted in FIG. 10 illustrates a set of search results where some of the search results have merchant coupons associated (as indicated by icon 1010). As discussed above, the search results can be processed prior to display to determine if any of the individual search result listings have merchant coupons associated with them. In some examples, merchant coupons will only be displayed if the user is logged in. In other examples, the search results may include merchant coupons that have campaign rules that do not require specific user demographics or past purchase history.

FIG. 11 is a user interface screen illustrating an example view item (VI) page containing a link to a merchant coupon. The UI screen depicted in FIG. 11 illustrates an example view item page that includes a link to a merchant coupon 1110. In this example, the savings available through use of the coupon is not indicated within this page. In another example, the potential savings through coupon redemption can be displayed within the view item page. When the potential savings is shown clicking on the purchase button (Buy It Now) may result in purchasing the product or service at the coupon discounted price. In the illustrated example, clicking on the coupon link 1110 can result in a pop-up display of available coupons, such as those illustrated in FIG. 12.

Figure 12C:
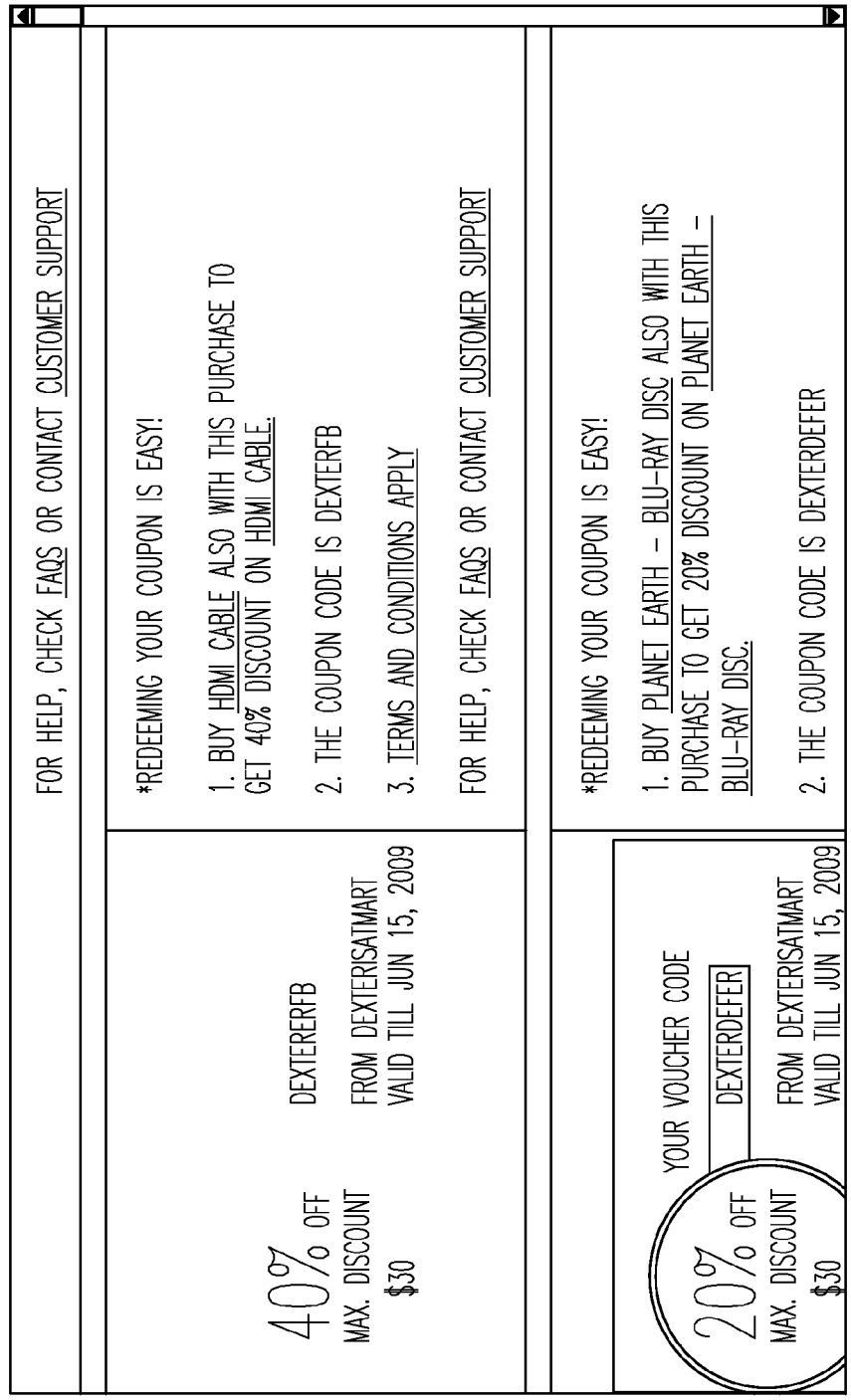

FIGS. 12A-C are user interface screens illustrating example pop-up coupon display windows depicting example merchant coupons. The pop-up coupon UI illustrated in FIGS. 12A-C demonstrates that a merchant can provide multiple coupon offers for a single item or multiple bundled coupon offers for purchase of additional accessories or related products within a single transaction.

FIG. 13 is a user interface screen illustrating an example purchase page containing a link to a merchant coupon. In this example, the UI screen illustrates another point in a purchase process that the system can display available merchant coupons. In this example, the coupon link 1310 is accessible just prior to committing to the purchase of a product or service.

Figure 14B:
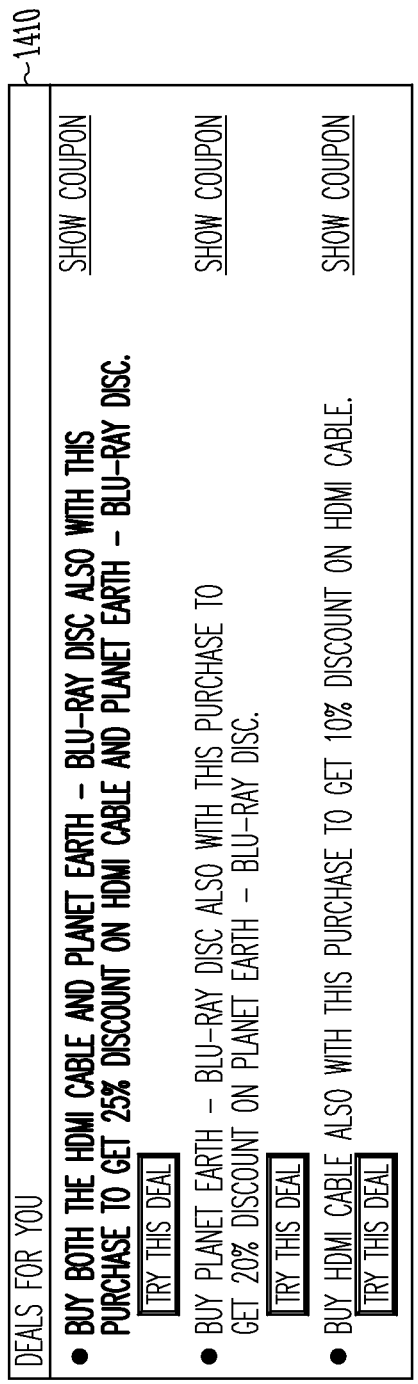

FIG. 14A-14B are user interface screens illustrating example virtual shopping cart pages containing additional (extra or bundled) offers from a merchant. In this example, the UI screen illustrates a virtual shopping cart containing a selected item with a merchant coupon applied. The UI screen also illustrates a series of additional offers from the merchant for potential bundle purchase coupons 1410. FIG. 14B illustrates the example additional merchant offers in more detail. The example offers include accessory and related item bundles, such as HDMI cables and Blu-Ray movies to go another with a Blu-Ray player purchase.

FIG. 15 is a user interface screen illustrating an example additional offers selection page. In this example, the UI screen is demonstrating how the system can display the details of one of the additional offers when selected. In this example, the additional offer 1510 is selected and the details of the selected offer are shown in window 1520.

Figure 16:
FIG. 16 is a user interface screen illustrating an example additional offers purchase page.

FIG. 16 is a user interface screen illustrating an example additional offers purchase page. In this example, the UI screen is demonstrating another example of how the system can display details of one of the additional merchant offers.

Figure 17:
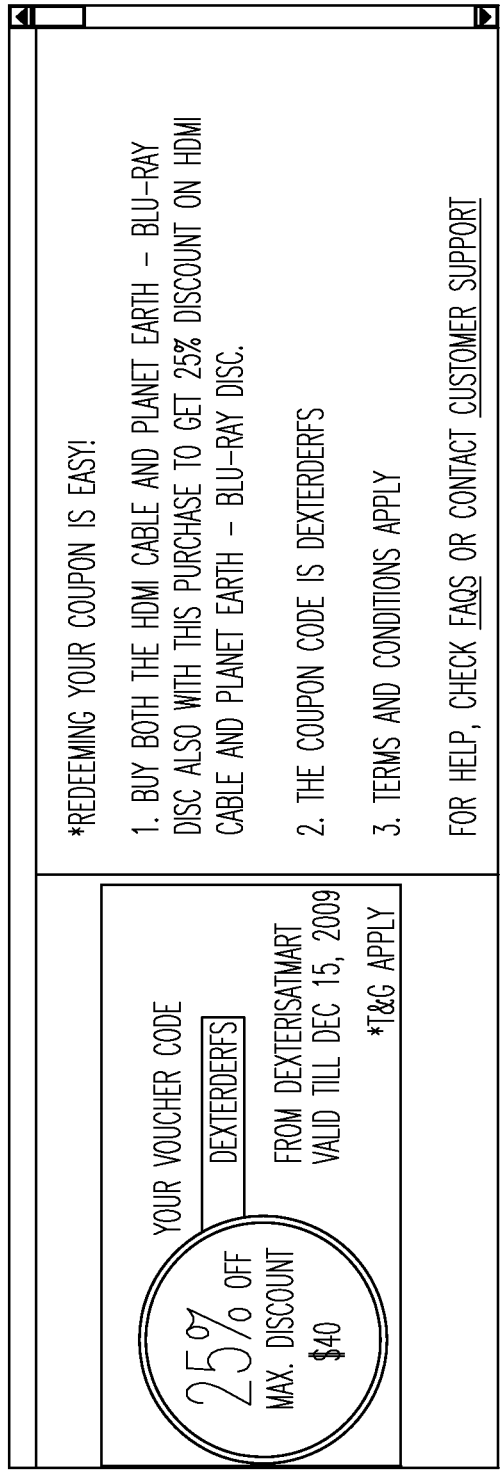
FIG. 17 is a user interface screen illustrating an example additional merchant offer pop-up coupon display.
Figure 20:
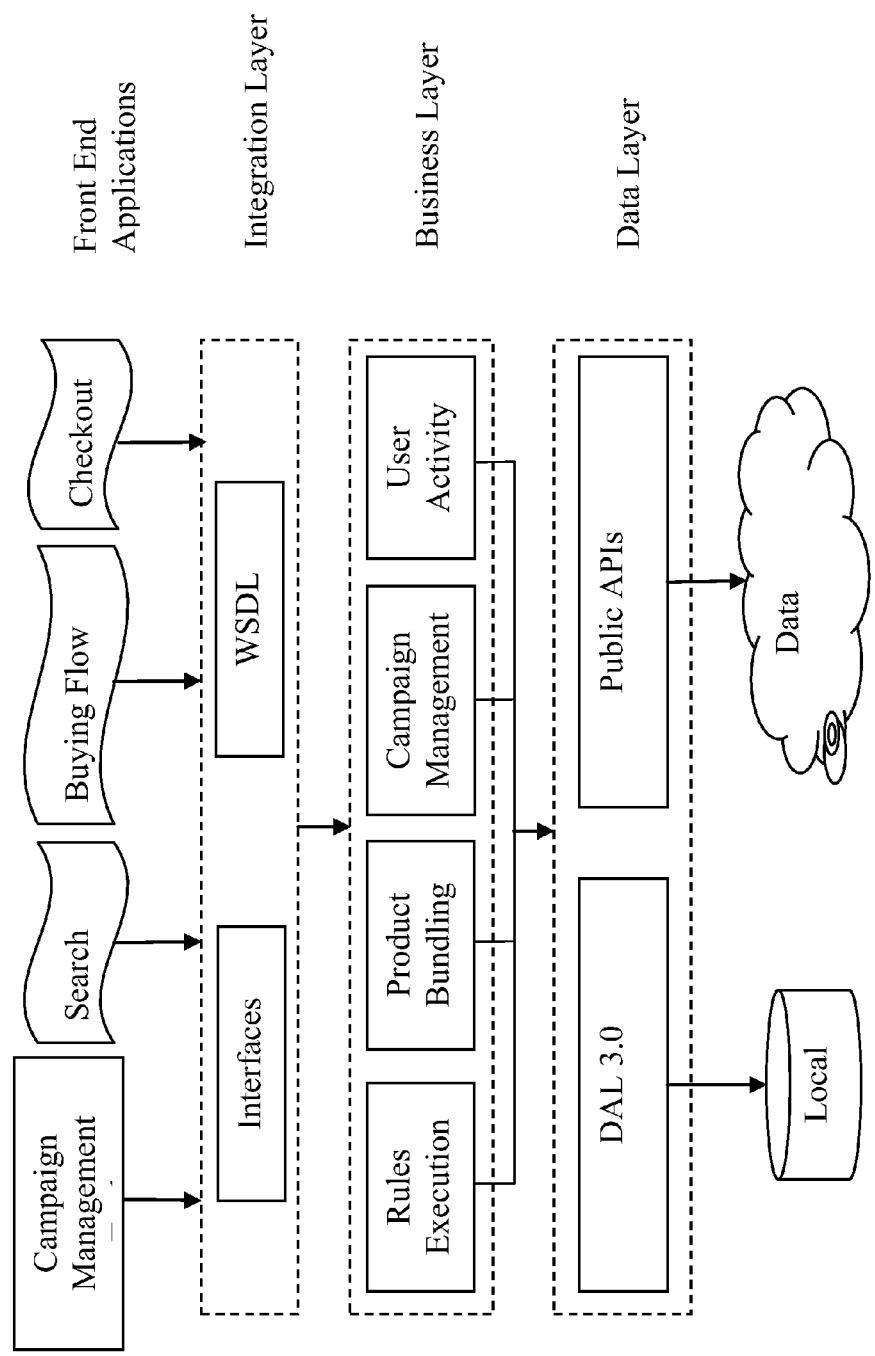
FIG. 20 is a block diagram illustrating an example system for enabling merchant funded and controlled coupon campaigns within a networked-publication system.
Figure 21:
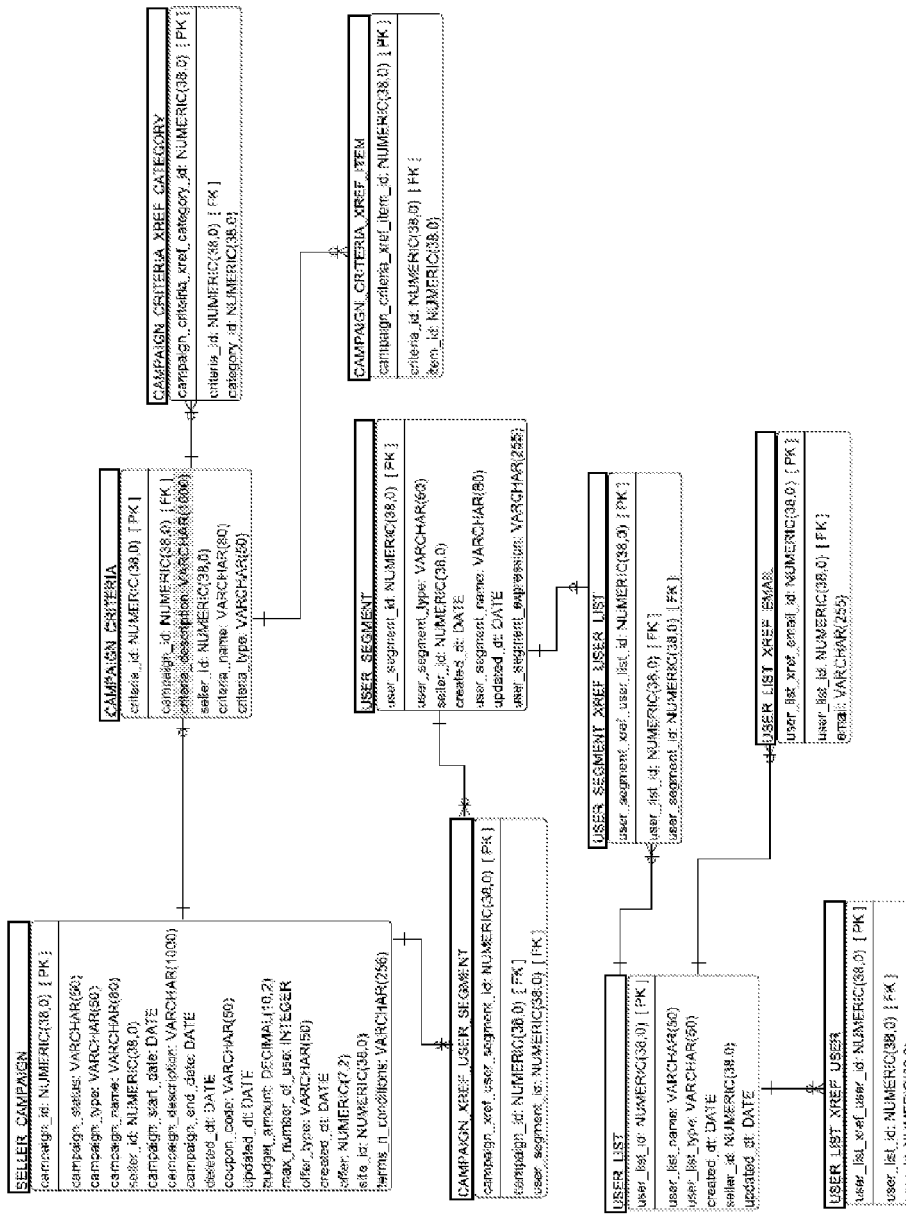
FIG. 21 is an entity relationship diagram illustrating an example data structure for supporting merchant coupon campaigns within a networked-publication system.

FIG. 17 is a user interface screen illustrating an example additional merchant offer pop-up coupon display. In this example, a pop-up merchant coupon is displayed after the user selected on of the "show coupon" links 1610 illustrated for example in FIG. 16.

FIG. 18 is a user interface screen illustrating an example additional merchant offers purchase page including a total price display. In this example, the UI screen is demonstrating yet another example of the details associated with the second additional merchant offer. The selected additional merchant offer provides a 20% discount on the purchase of a Blu-Ray movie.

FIG. 19 is a user interface screen illustrating an example additional merchant offers purchase page including a total price display. In this example, the UI screen is demonstrating display of the details for the third example additional merchant offer. The selected additional merchant offer provides a 40% discount on the purchase of an HDMI cable to connect the Blu-Ray player primary purchase. Each successive additional offer can be tried, but selecting the "remove this deal" button on the currently selected additional merchant offer and selecting a different offer.

Additional Example Coupon Modules

Figure 22:
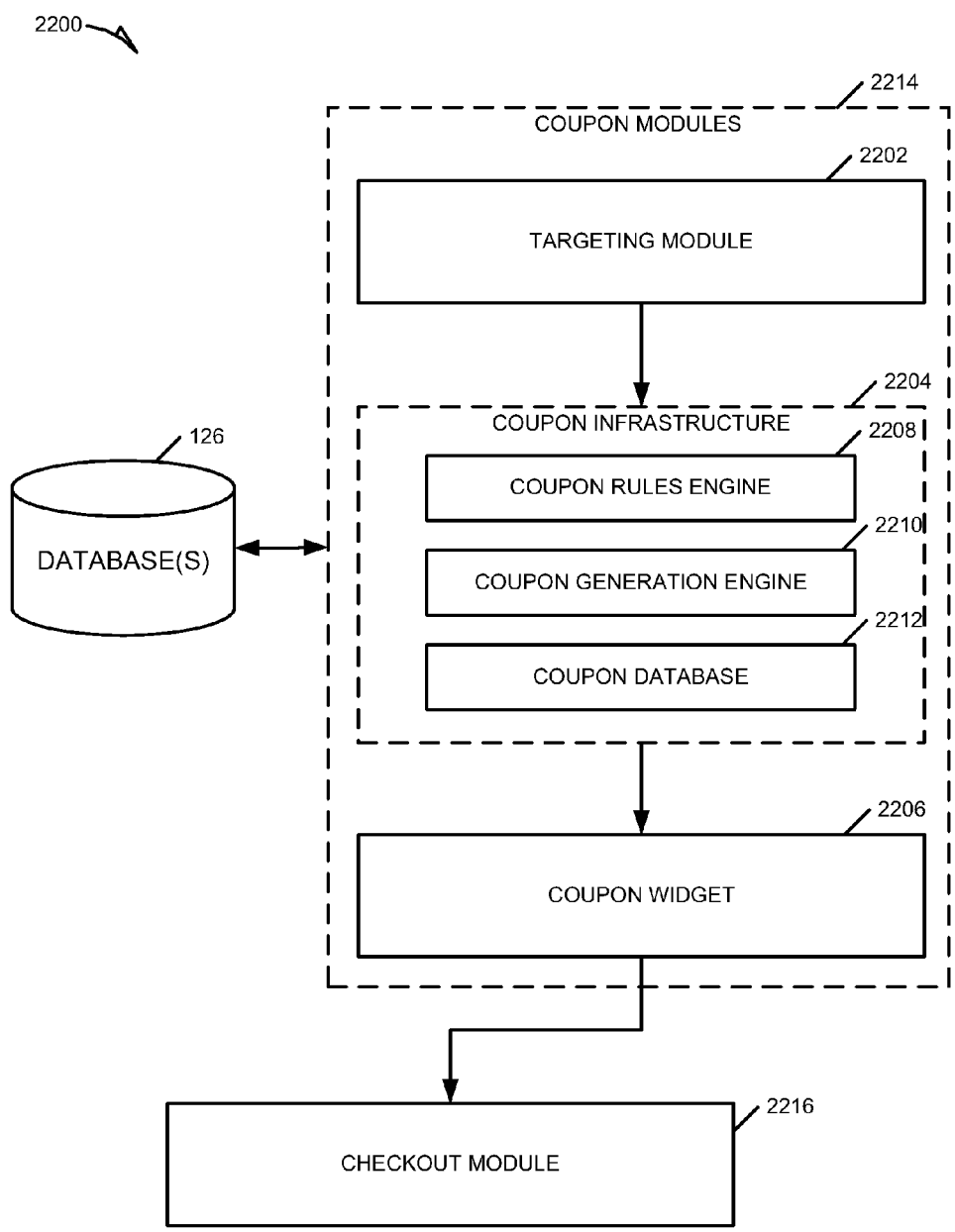
FIG. 22 is a block diagram illustrating an example system infrastructure to provide multi-merchant couponing.

FIG. 22 is a block diagram illustrating an example couponing system 2200 for dynamically issuing merchant funded coupons. As shown in the example illustrated by FIG. 22, the system 2200 includes coupon modules 2214, a checkout module 2216 and the databases 126. The coupon modules 2214 include a targeting module 2202, a coupon infrastructure 2204, and a coupon widget 2206. In certain examples, the coupon infrastructure 2204 includes a coupon rules engine 2208, a coupon generation engine 2210, and a coupon database 2212. The coupon database 2212 can be a separate stand-alone database within the coupon infrastructure 2204 or it can be one or more interconnected tables within the databases 126, such as the coupon table 518 illustrated in FIG. 22.

The targeting module 2202 is configurable to create coupon issuance models used by the coupon infrastructure 2204 to generate coupons for users of the networked system 102. The targeting module 2202 is configurable to create lists of users that are eligible to be issued coupons. In an example, the targeting module 2202 receives instructions from one or more of the publication system applications 120 to pull data from the databases 126 to create lists of coupon eligible users. In certain examples, the targeting module 2202 stores various coupon issuance models within the databases 126 for use in future couponing campaigns. The coupon issuance models can include various conditions that are evaluated by the coupon infrastructure 2204 in determining whether to issue a coupon. In certain examples, the targeting module can deliver coupons through the messaging applications 228, based on a list of eligible users.

The coupon infrastructure 2204, in some example embodiments, is responsible for evaluating coupon issuance models, generating and storing coupons for use by users within the networked system 102. In an example, the coupon infrastructure 2204 includes a coupon rules engine 2208 that can be used to evaluate one or more coupon issuance models. In certain examples, the coupon rules engine 2208 also determines whether a targeted user is on a list of users eligible to receive a coupon, before signaling the coupon generation engine 2210 to create a coupon. In another example, the coupon rules engine 2208 can select contextually relevant coupons for presentation to the user. In this example, the coupon rules engine 2208 receiving information regarding a user's current location, environment and/or context within the networked system 102 to determine which coupons may be relevant for display. In certain examples, the coupon generation engine 2210 can generate a coupon represented by coupon metadata, shown below in Table 1 as example XML tags. In other examples, the coupon generation engine 2210 generates coupons through interaction with the coupon database 2212. The coupon database 2212, in some example embodiments, stores all generated coupons for use within the networked system 102. The coupon infrastructure, in certain example embodiments, is configured to transmit coupons through communication channels external to the networked system 102. In some examples, the coupon infrastructure uses the messaging applications 228 to handle communication of coupons.

TABLE 1

Example Coupon Metadata

```
<CouponMetadata>
    <summary_action>insert</summary_action>
    <external_id>123456</external_id>
    <program_code>CRTYS200</program_code>
    <adjacency_id>0</adjacency_id>
    <incentive_type>3</incentive_type>
    <coupon_value_type>1</coupon_value_type>
    <coupon_application_type>1</coupon_application_type>
    <coupon_type>1</coupon_type>
    <iso_country_code>US</iso_country_code>
    <language>EN</language>
    <iso_currency_code>USD</iso_currency_code>
    <budget_amount>300000</budget_amount>
    <start_date>02/01/2008 14:59:59</start_date>
    <expiration_date>05/23/2008 00:59:59</expiration_date>
    <category_id>14339, 12314, 92382</category_id>
      <status>1</status>
    <display_message> <![CDATA[This is a custom description.
    The offer is {offer}%, up to ${max}. Min purchase is ${min}.]]>
    </display_message >
    <min_purchase_amount>200</min_purchase_amount>
    <coupon_max_discount_amount>500</coupon_max_discount_
    amount>
    <faq_url>http://www.mpname.com/us_termsfaq.html</faq_url>
    <coupon_discount_percent>14.5</coupon_discount_percent>
    <incntv_max_usage_count>5</incntv_max_usage_count>
</CouponMetadata>
```

The coupon widget 2206 is configurable to present coupons generated by the coupon infrastructure 2204 to a user accessing the networked system 102. In certain examples, the coupon widget can also be configured to communicate coupons over various communication channels, both internal and external to the networked system 102, such by leveraging the messaging applications 228. In some examples, the coupon widget 2206 may be a small applet that runs within a third party application 128 to display coupons to registered users of the network system 102. For example, a Facebook application can incorporate the coupon widget 2206 and be configured to display coupons to a user within the user's Facebook account. In these examples, the coupon widget 2206 is configurable to communication through the API server 114 in order to access the coupon infrastructure 2204. In these various examples, the coupon infrastructure can coordinate delivery of a targeted coupon to a user through both the coupon widget 2206 and the messaging applications 228. The coupon widget can also present contextually relevant coupons selected by the coupon rules engine 2208 based on current user interactions with the networked system 102.

The checkout module 2216 is configurable to allow a user of the networked system 102 to complete the purchase process. The coupon widget 2206 is configurable to work in conjunction with the checkout module 2216 to present contextually relevant coupons to the user during the checkout process. In some examples, the coupon widget 2206 can display only those coupons that can be applied to the items the user is attempting to checkout using the checkout module 2216. In certain examples, the checkout module 2216 can support selection of coupons stored in the coupon infrastructure 2204 as well as entry of legacy coupon codes.

Additional Example Coupon System

Figure 23:
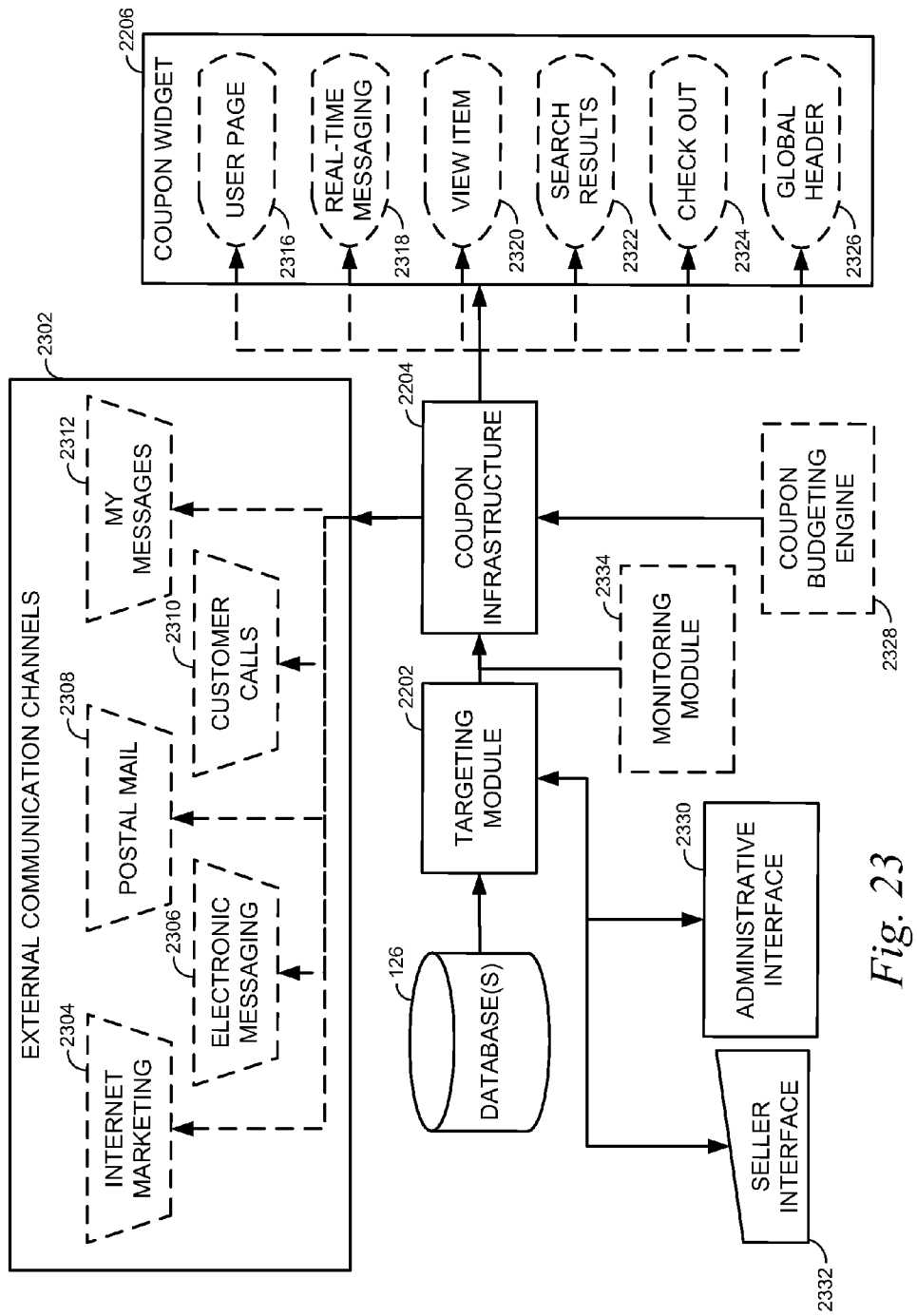
FIG. 23 is a block diagram illustrating an example system for providing multi-merchant couponing.

FIG. 23 is a block diagram illustrating an example coupon system 2300, which can be implemented as part of a networked system 102. In an example embodiment, the coupon system 2300 includes the targeting module 2202, the coupon infrastructure 2204, the coupon widget 2206, external communication channels 2302, an administrative interface 2330, and the databases 126. In some examples, the coupon system 2300 also includes a seller interface 2332, a monitoring module 2334, and a coupon budgeting engine 2328.

The coupon system 2300, in an example embodiment, includes various external communication channels, such as internet marketing 2304, electronic messaging 2306, postal mail 2308, customer calls 2310 and my messages 2312. In an example, the internet marketing channel 2304 can be used to present targeted user coupons to registered users of the network system 102 while the user is accessing a third party's web site or application. For example, the internet marketing channel 2304 is configurable to deliver targeted coupons through Internet search engines, such as www.yahoo.com (provided by Yahoo!, Inc. of Sunnyvale, Calif.). In some examples, the external communication channels 2302 can also be supported through the messaging applications 228. For example, the "my messages" channel 2312 can be an external messaging system operating on the networked system 102 and supported by the messaging applications 228.

In various example embodiments, the coupon widget 2206 is configurable to surface coupons within the network system 102 through a user page 2316, real-time messaging 2318, a view item listing page 2320, a customer service interface 2322, a checkout mechanism 2324, and a global web page header 2326. The user page 2316 can be provided through the personalization applications 210 and is configurable to display information associated with a registered user's interactions with the network system 102. In an example, real-time messaging 2318 is configurable to display messages, such as coupons, to a user browsing on the network system 102. For example, a user may enter a search request on the network system 102, the search request can return a list of results and a portion of the web page may include a message delivered through real-time messaging 2318. The message delivered through real-time messaging can include one or more coupons issued to the user relevant to the search results. In certain examples, each web page generated by the network system 102 can include a common global header 2326 with a section dedicated to displaying information associated with a registered user. In an example embodiment, the coupon infrastructure 2204 coordinates coupon delivery between the external communication channels 2302 and the coupon widget 2206. For example, a coupon generated for a specific user can be delivered to the networked system 102 via the coupon widget, while the same coupon is sent via electronic messaging 2306 to the user's cellular phone. In this example, within the networked system 102, the coupon widget 2206 may surface the coupon within the user's user page 2316 or through the global header 2326.

In an example, the administrative interface 2330 can be used to setup coupon campaigns within the targeting module 2202. Coupon campaigns can include the creation of a list of users eligible to receive a coupon as well as one or more rules or conditions, which may be stored in a coupon issuance model. In certain examples, the administrative interface 2330 can be used to create and store, within the database 126, coupon issuance models for future coupon campaigns. In these examples, a coupon campaign refers to the creation of a promotion within the networked system 102 to encourage users to make purchases through issuing coupons, such as five (5) dollars off your next purchase or ten percent (10%) off an iPod brand music player (from Apple, Inc. of Cupertino, Calif.). In some examples, the coupon budgeting engine 2328 can be used to configure the financial aspects of a coupon campaign, as well as the start and end dates of the campaign. For example, through the coupon budgeting engine 2328, a seller or merchandiser can configure a coupon campaign to issue up to five thousand dollars in a certain type of coupon and have the campaign run from May 1st through September 1st. In another example, the coupon budgeting engine 2328 can monitor the coupon infrastructure 2204 to determine when a pre-selected dollar amount of issued coupons have been redeemed, as a measure of when to end a coupon campaign.

In some example embodiments, the monitoring module 2334 is configurable to track the activity of a user interacting with the networked system 102. The monitoring module 2334 can provide this real-time activity information to the coupon infrastructure 2204 for use in evaluating whether a user has met the necessary conditions to issue a coupon. For example, a certain coupon campaign may require that a user view three listings within a certain category during a single user session prior to issuing a coupon. In this example, the monitoring module 2334 can track the user's interactions and provide real-time information to the coupon rules engine 2208 where the condition can be evaluated. As soon as the user visits the third listing within a specified category, the coupon rules engine 2208 can trigger the coupon generation engine 2210 issue a coupon to the user, which can then be presented through the coupon widget 2206. In this example, the coupon widget 2206 can present the coupon during the current user session, while the user may still be considering a purchase. The monitoring module 2334 can also provide information to the coupon infrastructure to enable contextual display of coupons based on a user's current location within the networked system 102.

Data Structures

Figures 24A, 24B:
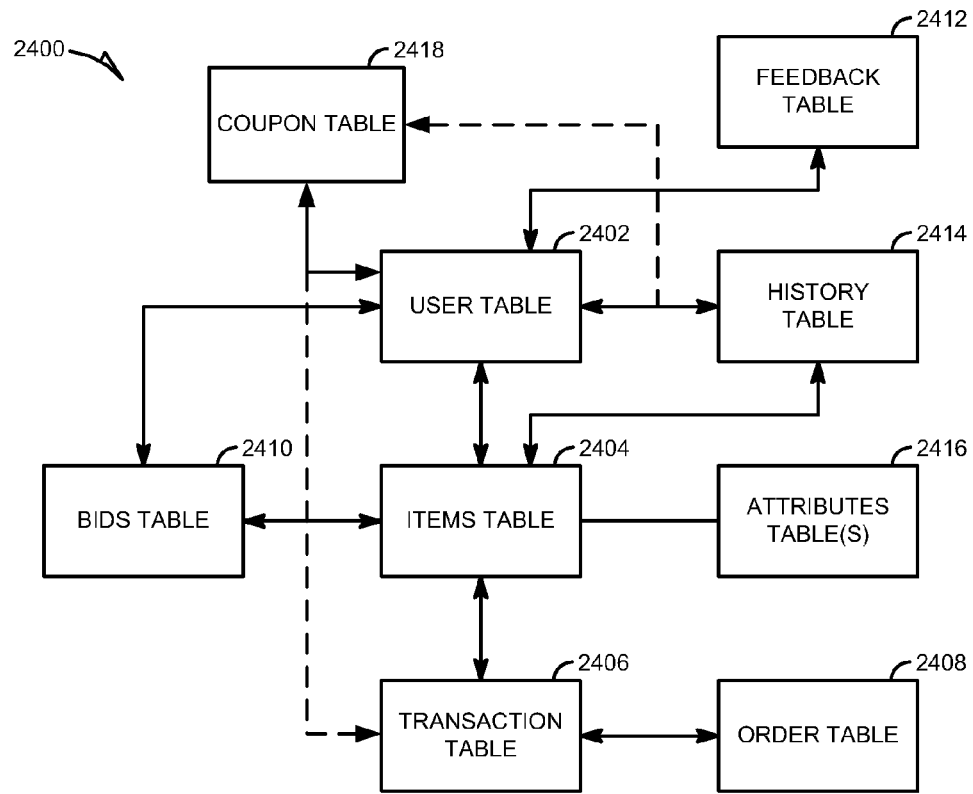
FIG. 24A is a high-level entity-relationship diagram, illustrating various tables that may be maintained within data
- FIG. 24B is a block diagram illustrating example fields in an example coupon table.
Figure 25:
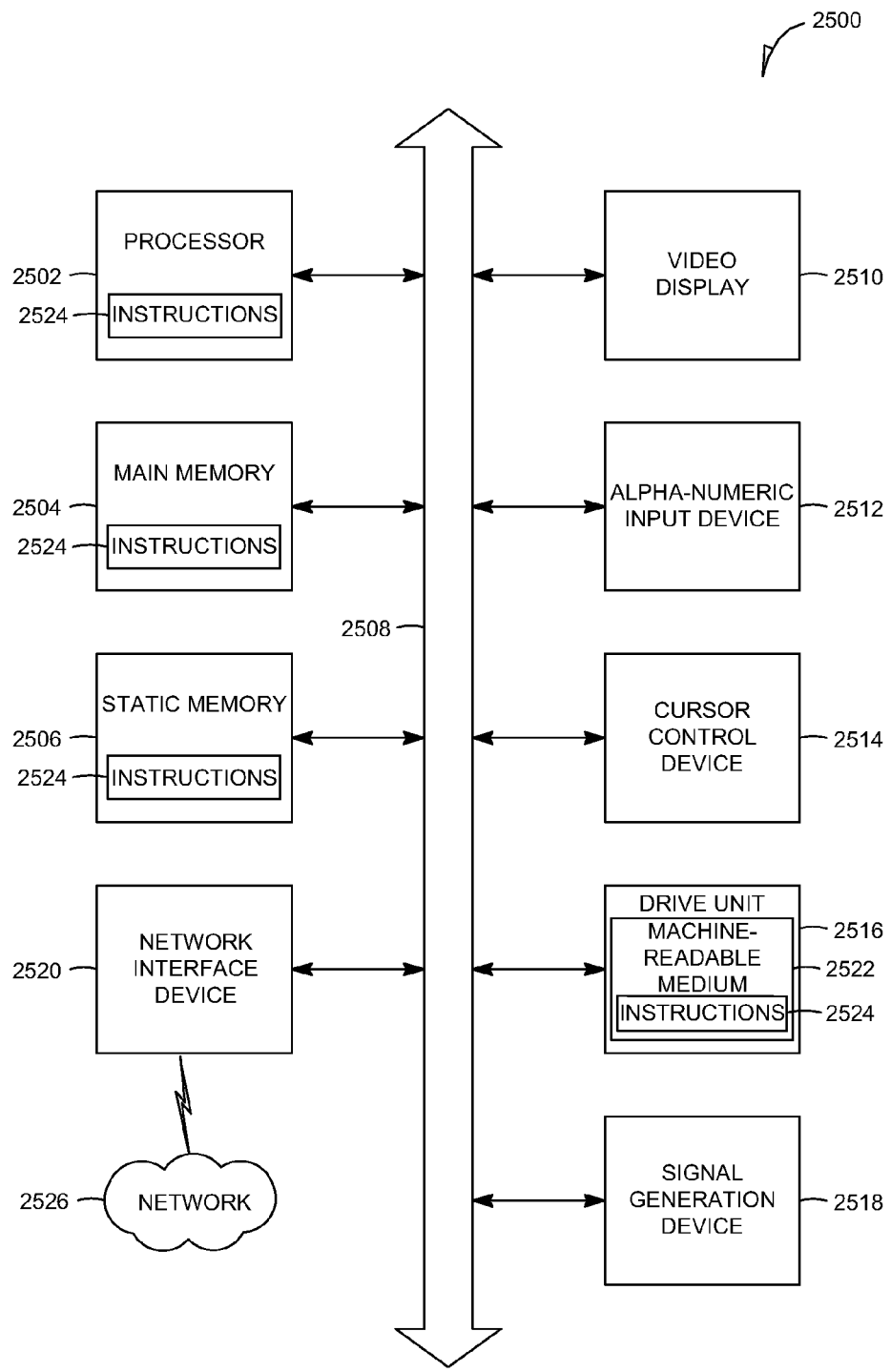
FIG. 25 is a diagrammatic representation of machine in the example form of a computer system within which a set of instructions for causing the machine to perform any one or more of the methodologies discussed herein may be executed.

FIG. 24A is a high-level entity-relationship diagram, illustrating various tables 2400 that may be maintained within the databases 126, and that are utilized by and support the applications 120, 122, and 132. A user table 2402 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 2400 can also include an items table 2404 in which are maintained item records for goods and services that are available to be, or have been, transacted via the networked system 102. Each item record within the items table 2404 may furthermore be linked to one or more user records within the user table 2402, so as to associate a seller and one or more actual or potential buyers with each item record.

A transaction table 2406 contains a record for each transaction (e.g., a purchase or sale transaction) pertaining to items for which records exist within the items table 2404.

An order table 2408 is populated with order records, each order record being associated with an order. Each order, in turn, may be with respect to one or more transactions for which records exist within the transaction table 2406.

Bid records within a bids table 2410 each relate to a bid received at the networked system 102 in connection with an auction-format listing supported by an auction application 202. A feedback table 2412 is utilized by one or more reputation applications 208, in one example embodiment, to construct and maintain reputation information concerning users. A history table 2414 maintains a history of transactions to which a user has been a party. One or more attributes tables 2416 record attribute information pertaining to items for which records exist within the items table 2404. Considering only a single example of such an attribute, the attributes tables 2416 may indicate a currency attribute associated with a particular item, the currency attribute identifying the currency of a price for the relevant item as specified in by a seller.

A coupon table 2418 can be populated with coupon records, each coupon record being associated with a user. In this example, coupons are issued to an individual user. Each coupon may also be associated with a transaction in the transaction table 2406, provided the coupon has been redeemed by the user. A redeemed coupon may also have an associated record in the history table 2414.

FIG. 24B is a block diagram illustrating example fields in an example coupon table 2418. In an example, the coupon table 2418 can include fields including User ID 2420, External ID 2422, Program Code 2424, Incentive Type 2426, Value Type 2428, Application Type 2430, Coupon Type 2432, ISO Country Code 2434, Budget Amount 2436, Start Date 2438, Expiration Date 2440, Category ID 2442, Status 2444, Display Message 2446, Minimum Purchase Amount 2448, Maximum Discount Amount 2450, Discount Percentage 2452, and Maximum Usage Count 2454. In other examples, the coupon table 2418 could include additional fields, such as Transaction ID, linking the coupon to a completed transaction. The User ID 2420 can be a link into the User Table 2402. The External ID 2422 can used to identify the coupon in third party systems, for example. The Program Code 2424 can be used to identify the coupon campaign responsible for issuing the coupon. The Incentive Type 2426 can be used in an example to indicate who issued the coupon. In some examples, coupons can be issued by the networked system 102, by individual seller's providing merchandise or services through the networked system 102, or by product manufacturers. The coupon Type 2432 can be used to indicate whether the coupon is a fixed value coupon or a percent off coupon. The ISO Country Code 2434 can be used to indicate what countries the coupon is valid within. The Budget Amount 2436 can be used to indicate the total budget for the coupon campaign. In certain examples, a coupon is configurable to automatically expire once the budget amount assigned to the coupon campaign is reached. The Start Date 2438 can be used to indicate the earliest date on which the coupon can be redeemed. The Expiration Date 2440 can be used to indicate the last date on which the coupon can be redeemed. In certain example, a coupon can be associated with a particular product or service category within the networked system 102. In these examples, the Category ID 2442 can be used to link the coupon to the valid category. The Status 2444 can be used to indicate whether the coupon is active, redeemed, or expired, for example. The Display Message 2446 can be used to provide a message to the user upon receiving or redeeming the coupon. The Minimum Purchase Amount 2448 can be used to indicate a minimum purchase necessary to redeem the coupon. The Maximum Discount Amount 2450 can be used to indicate the maximum dollar value (monetary value) of the coupon. For example, the coupon could be a 10% off coupon with a maximum discount amount of $50, which means that anything purchased over $500 would still only receive $50 off the purchase price. The Discount Percentage 2452 can be used to indicate the percent value of a percentage off type coupon. The Maximum Usage Count 2454 can be used to indicate how many times a coupon can be redeemed. For example, a single use coupon can have a maximum usage count 2454 of one.

The previous paragraph provides a description of an example embodiment of the coupon table 2418. The described embodiment can include additional or fewer fields depending upon the capabilities provided within a particular networked system 102.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

FIG. 22 is a block diagram of machine in the example form of a computer system 2200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes a processor 2502 (e.g., a central processing unit (CPU), a graphics processing unit (GPU) or both), a main memory 2504 and a static memory 2506, which communicate with each other via a bus 2508. The computer system 2500 may further include a video display unit 2510 (e.g., a liquid crystal display (LCD) or a cathode ray tube (CRT)). The computer system 2500 also includes an alphanumeric input device 2512 (e.g., a keyboard), a user interface (UI) navigation device 2514 (e.g., a mouse), a disk drive unit 2516, a signal generation device 2518 (e.g., a speaker) and a network interface device 2520.

Machine-Readable Medium

The disk drive unit 2516 includes a machine-readable medium 2522 on which is stored one or more sets of instructions and data structures (e.g., software) 2524 embodying or utilized by any one or more of the methodologies or functions described herein. The instructions 2524 may also reside, completely or at least partially, within the main memory 2504 and/or within the processor 2502 during execution thereof by the computer system 2500, the main memory 2504 and the processor 2502 also constituting machine-readable media.

While the machine-readable medium 2522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2524 may further be transmitted or received over a communications network 2526 using a transmission medium. The instructions 2524 may be transmitted using the network interface device 2520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system to dynamically issue coupons to a user on a network-based publication system have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   generating, at a multi-merchant publication system, an item listing based on information received from a merchant-computer;
   receiving, from the merchant-computer, information specifying a set of coupon criteria, which, if detected, are to result in presenting a coupon for the item listing;
   detecting an event within the multi-merchant publication system satisfying a particular coupon criteria from the set of coupon criteria;
   presenting a coupon, associated with the item listing, in response to detecting the event; and
   dynamically determining availability of a bundled offer associated with the item listing, wherein the presenting the coupon includes displaying the bundled offer associated with the item listing.

2. The method of claim 1, wherein detecting the event includes detecting a search request, the search request at least partially satisfied by the item listing.

3. The method of claim 2, wherein the presenting the coupon includes displaying a coupon indictor associated with the item listing within a list of search results satisfying the search request.

4. The method of claim 1, wherein detecting the event includes extracting user-profile data associated with a user viewing the item listing within the multi-merchant publication system, the user-profile data satisfying the particular coupon criteria.

5. The method of claim 4, wherein extracting user-profile data associated with the user includes determining whether the user is a new or repeat customer in relationship to a particular merchant associated with the item listing.

6. The method of claim 5, wherein extracting user-profile data associated with the user includes determining that the user made a previous purchase satisfying the particular coupon criteria.

7. The method of claim 1, wherein determining availability of the bundled offer includes determining that the event or user-profile data associated with the user satisfies a second coupon criteria, the second coupon criteria associated with the bundled offer.

8. The method of claim 7, wherein determining availability of the bundled offer includes satisfying the second coupon criteria, the second coupon criteria is selected from a group of coupon criteria including:
the item listing is within a particular category;
the user-profile data includes a particular demographic characteristic;
the event is related to an auction;
the event is related to browsing activity detected during a current session;
the event is related to browsing activity detected during a past session;
the event is related to a previous purchase;
the user-profile data includes information indicating the user is a repeat customer; and
the user-profile data includes information indicating the user is a new customer.

9. The method of claim 1, wherein the presenting the coupon includes displaying a calculation of the savings associated with the coupon and the savings associated with the bundled offer when applied to a purchase of the item listing and bundled offer.

10. The method of claim 1 further comprising:
determining availability of a plurality of bundled offers associated with the item listing, wherein the presenting the coupon includes displaying the plurality of bundled offers associated with the item listing.

11. The method of claim 9 further comprising:
detecting selection of a first bundled offer of the plurality of bundled offers associated with the item listing;
displaying a calculation of the savings associated with the first bundled offer; and
providing an option to select a second bundled offer of the plurality of bundled offers.

12. A multi-merchant publication system comprising:
an application server including a processor, a memory, and a network interface, the memory including instructions which when executed by the processor cause the system to:
generate an item listing based on information received over the network interface from a merchant-computer;
receive, over the network interface from the merchant-computer, information specifying a set of coupon criteria, which, if detected, are to result in presenting a coupon for the item listing;
detect an event within the multi-merchant publication system satisfying a particular coupon criteria from the set of coupon criteria;
publish a coupon, associated with the item listing, in response to detecting the event;
dynamically determine availability of a bundled offer associated with the item listing; and
display the bundled offer in association with the item listing.

13. The multi-merchant publication system of claim 12, wherein the memory includes instructions which cause the system to detect the event by detecting a search request, the search request at least partially satisfied by the item listing.

14. The multi-merchant publication system of claim 13, wherein the memory includes instructions which cause the system to publish the coupon at least in part by displaying a coupon indicator associated with the item listing within a list of search results satisfying the search request.

15. The multi-merchant publication system of claim 12 further including:
a database communicatively coupled to the application server, the database containing user-profile data associated with users of the multi-merchant publication system; and
wherein the memory includes instructions which cause the system to detect the event at least in part by extracting user-profile data associated with a user viewing the item listing from the database, the user-profile data satisfying the particular coupon criteria.

16. The multi-merchant publication system of claim 15, wherein the memory includes instructions which cause the system to determine, from the user-profile data, whether the user is a new or repeat customer in relationship to a particular merchant associated with the item listing.

17. The multi-merchant publication system of claim 12, wherein the memory includes instructions which cause the system to determine the availability of the bundled offer at least in part by determining that the event or user-profile data associated with the user satisfies a second coupon criteria, the second coupon criteria associated with the bundled offer.

18. A computer-readable storage medium including instructions which when executed by a processor, cause the processor to:
receive registration information from a plurality of merchant-computers;
generate an item listing based on information received from a first merchant-computer of the plurality of merchant-computers;
receive, from the merchant-computer, information specifying a set of coupon criteria, which, if detected, are to result in presenting a coupon for the item listing;
detect an event satisfying a particular coupon criteria from the set of coupon criteria;
present a coupon, associated with the item listing, in response to detecting the event;
dynamically determine availability of a bundled offer associated with the item, wherein the instructions to present the coupon include instructions to display the bundled offer associated with the item listing.

* * * * *